US012479102B2

(12) United States Patent
Lee et al.

(10) Patent No.: US 12,479,102 B2
(45) Date of Patent: Nov. 25, 2025

(54) APPARATUS AND METHOD FOR PISTON INSERTION

(71) Applicants: HYUNDAI MOTOR COMPANY, Seoul (KR); KIA CORPORATION, Seoul (KR)

(72) Inventors: Seung Yeop Lee, Ulsan (KR); Dong Ho Kwak, Ulsan (KR); Yong Tae Kim, Ulsan (KR); Young Seok Lee, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 775 days.

(21) Appl. No.: 17/523,132

(22) Filed: Nov. 10, 2021

(65) Prior Publication Data
US 2022/0402138 A1    Dec. 22, 2022

(30) Foreign Application Priority Data
Jun. 22, 2021   (KR) .................. 10-2021-0081149

(51) Int. Cl.
| *B25J 9/00* | (2006.01) |
| *B25J 9/14* | (2006.01) |
| *B25J 9/16* | (2006.01) |
| *B25J 13/08* | (2006.01) |
| *G05B 19/418* | (2006.01) |

(52) U.S. Cl.
CPC ............. *B25J 9/1687* (2013.01); *B25J 9/144* (2013.01); *B25J 13/085* (2013.01); *G05B 19/41805* (2013.01); *G05B 2219/31031* (2013.01)

(58) Field of Classification Search
None
See application file for complete search history.

(56) References Cited

U.S. PATENT DOCUMENTS

| 6,886,241 | B2* | 5/2005 | Tachibana | B23P 19/043 |
| | | | | 29/283 |
| 9,868,181 | B2* | 1/2018 | Osato | B23P 19/04 |
| 2005/0113971 | A1* | 5/2005 | Zhang | B25J 9/1687 |
| | | | | 700/245 |
| 2007/0169231 | A1* | 7/2007 | Zhang | B25J 9/0084 |
| | | | | 29/283 |
| 2014/0023472 | A1* | 1/2014 | Sueoka | B25J 15/00 |
| | | | | 414/800 |
| 2014/0137689 | A1* | 5/2014 | Nogami | B25J 9/0087 |
| | | | | 901/27 |
| 2015/0183069 | A1* | 7/2015 | Lee | B25J 9/0087 |
| | | | | 29/799 |

* cited by examiner

*Primary Examiner* — Truc M Do
(74) *Attorney, Agent, or Firm* — MCDONNELL BOEHNEN HULBERT & BERGHOFF LLP

(57) ABSTRACT

Provided is an apparatus for piston insertion, including an insertion robot having a plurality of robot arms connected by a plurality of articulated joints, a piston insertion module directly mounted on the insertion robot, gripping a piston assembly, and inserting the piston assembly into a cylinder bore of a cylinder block, and a controller controlling an operation of the insertion robot and an operation of the piston insertion module.

15 Claims, 21 Drawing Sheets

APPARATUS AND METHOD FOR PISTON INSERTION

CROSS-REFERENCE TO RELATED APPLICATION

This application is based on and claims the benefit of priority to Korean Patent Application No. 10-2021-0081149, filed on Jun. 22, 2021, in the Korean Intellectual Property Office, the disclosure of which is incorporated herein in its entirety by reference.

TECHNICAL FIELD

The present disclosure relates to an apparatus and a method for piston insertion, and more particularly, to an apparatus and a method for piston insertion capable of accurately inserting a piston into a cylinder bore of a cylinder block.

BACKGROUND

Vehicles such as cars, ships, and airplanes may be configured to move using power generated by power sources such as internal combustion engines. The internal combustion engine includes a cylinder block, a crankshaft rotating in the cylinder block, a piston reciprocating in a cylinder bore of the cylinder block, and a connecting rod connecting the piston to the crankshaft.

During an assembly process of the internal combustion engine, a piston assembly is inserted into the cylinder bore of the cylinder block by piston insertion equipment. The piston assembly includes a piston, a piston ring, and a connecting rod.

Existing piston insertion equipment is divided into fully-automated equipment and semi-automated equipment.

The fully-automated equipment includes an inverter for inverting the piston assembly, a piston transfer robot for transferring the piston assembly, a block transfer robot for transferring the cylinder block, and an insertion device for inserting the piston assembly into the cylinder bore. As the fully automated equipment is made up of a plurality of robots and a plurality of units, its manufacturing cost may be relatively high, and it may take up a relatively large installation space. In addition, as the overall operating structure and interlock system become complex, the repair time may become onerously long.

The semi-automated equipment includes a block transfer robot for transferring and inverting the cylinder block. When the cylinder block is positioned in a working area as the block transfer robot inverts and transfers the cylinder block, an operator inserts the piston assembly into the cylinder bore of the cylinder block using a jig. With the semi-automated equipment, since the piston assembly is manually inserted into the cylinder bore by the operator, the assembly cycle, piston insertion quality, and equipment operational rate may not be constant, depending on the operator's skill.

The above information described in this background section is provided to assist in understanding the background of the inventive concept, and may include any technical concept which is not considered as the prior art that is already known to those skilled in the art.

SUMMARY

The present disclosure addresses the above-mentioned problems occurring in the prior art without compromising, or while maintaining advantages achieved.

An aspect of the present disclosure provides an apparatus and a method for piston insertion employing a relatively small number of robots as a piston insertion module is directly mounted on an insertion robot, thereby reducing equipment investment costs and manufacturing costs.

According to an aspect of the present disclosure, an apparatus for piston insertion may include: an insertion robot having a plurality of robot arms connected by a plurality of articulated joints, a piston insertion module directly mounted on the insertion robot, gripping a piston assembly, and inserting the piston assembly into a cylinder bore of a cylinder block, and a controller controlling an operation of the insertion robot and an operation of the piston insertion module.

As the piston insertion module is directly mounted on the insertion robot, the apparatus may have a simplified layout, reduce equipment investment cost and manufacturing cost, and take up a relatively small installation space. By cooperation of the insertion robot and the piston insertion module, the piston insertion may be performed accurately and efficiently, and thus unmanned automation may be facilitated.

The piston insertion module may include: a gripper gripping and ungripping the piston assembly, and a push mechanism including a push rod moving vertically, and a push actuator causing the push rod to move.

The piston assembly may be gripped by the gripper, and the piston assembly may be inserted into the cylinder bore by the push mechanism. The piston insertion module may continuously and automatically perform the gripping operation of the piston assembly and the insertion operation of the piston assembly so that the piston insertion module may accurately and easily insert the piston assembly into the cylinder bore through cooperation with the insertion robot.

The gripper may include: a plurality of grip members moving between a grip position in which the grip members grip the piston assembly and an ungrip position in which the grip members ungrip the piston assembly, and a grip actuator causing the plurality of grip members to move. The grip actuator may include: a housing, and a plurality of plungers movably mounted on the housing. The number of grip members may correspond to the number of plungers. The plurality of grip members may be connected to the plurality of plungers, respectively, and each grip member may move with the corresponding plunger connected thereto in the same direction.

The gripper may grip and ungrip the piston assembly in a radial direction of the piston assembly using the plurality of grip members and the grip actuator, whereby the gripping and ungripping of the piston assembly may be easily performed.

The grip actuator may be a pneumatic cylinder to which an air supply line and an air return line are connected. As air is supplied from an air source to the housing through the air supply line, the plurality of plungers may move outward from the housing, and as the air is returned from the housing to the air source through the air return line, the plurality of plungers may move into the housing.

The grip actuator may further include an electronic pressure regulator mounted on the air supply line, and the controller may control the electronic pressure regulator to regulate a pressure of air supplied to the grip actuator. The electronic pressure regulator may regulate the pressure of the air according to a control signal transmitted from the controller. Since the pressure of the air supplied to the grip actuator is steplessly regulated by the electronic pressure regulator, the plurality of grip members may freely adjust a gripping force when gripping the piston assembly.

Specifically, when the piston insertion module picks up the piston assembly from a piston holder, the pressure of the air supplied to the grip actuator may be relatively increased (for example, 5 bar) by the electronic pressure regulator so that the gripper may grip the piston assembly with a relatively large gripping force. When the push mechanism pushes the piston assembly to the cylinder bore, the pressure of the air supplied to the grip actuator may be relatively reduced (for example, 1 bar) by the electronic pressure regulator so that the gripper may grip the piston assembly with a relatively small gripping force. Accordingly, the piston assembly may be smoothly inserted into the cylinder bore, and an insertion load acting when the piston assembly is inserted into the cylinder bore may be relatively reduced.

Each grip member may include: a grip portion gripping the piston assembly, and a connection portion provided on a top end of the grip portion. The grip portion may have a grip surface that matches a portion of an outer surface of a piston of the piston assembly, and the connection portion may be connected to a bottom surface of the corresponding plunger.

Each grip member may be firmly mounted on the bottom surface of the corresponding plunger through the connection portion so that the grip member may be precisely moved by the grip actuator.

The piston insertion module may further include a centering mechanism located above the gripper, and causing a center of the piston assembly to be aligned with a center of the cylinder bore.

The centering of the piston assembly with respect to the cylinder bore of the cylinder block may be performed by the centering mechanism.

The push rod may extend through the gripper and the centering mechanism, and the push actuator may be located above the centering mechanism, and accordingly, the gripper, the centering mechanism, and the push mechanism may be arranged vertically.

As the gripper, the centering mechanism, and the push mechanism are arranged vertically, the piston insertion module may be a compact structure as a whole, which may allow the piston insertion module and the insertion robot to be easily assembled.

The piston insertion module may further include: an upper plate directly mounted on the insertion robot, and a lower plate located below the upper plate. The push actuator may be mounted on the upper plate, and the centering mechanism may be mounted on the lower plate.

Thus, the push actuator may be stably supported to the upper plate, and the centering mechanism may be stably supported to the lower plate.

The centering mechanism may include: a fixed portion fixed to the lower plate, and a floating portion moving relative to the fixed portion. The gripper may be fixed to the floating portion. In the centering mechanism, the fixed portion may be fixed to the lower plate, and the floating portion may be fixed to the gripper. Thus, a position of the gripper may be moved relative to the lower plate.

The centering mechanism may adjust the position of the gripper, thereby performing the centering operation that allows the center of the piston assembly to be aligned with the center of the cylinder bore.

The insertion robot may include a sensor sensing a torque and a force acting on the plurality of articulated joints and the plurality of robot arms. When the piston assembly comes into contact with a portion of the cylinder block, the sensor of the insertion robot may sense a force acting between the piston assembly and the cylinder block. The insertion robot may be configured to adjust a position of the piston insertion module under control of the controller depending on the force sensed by the sensor so as to cause the center of the piston assembly to be aligned with the center of the cylinder bore.

As the insertion robot allows the center of the piston assembly to be aligned with the center of the cylinder bore by the sensor and the controller, the centering of the piston assembly with respect to the cylinder bore may be corrected. Since the center of the piston assembly is aligned with the center of the cylinder bore more accurately, damage or breakage of the piston assembly and/or the cylinder bore may be reliably prevented when the piston assembly is inserted into the cylinder bore, and the insertion operation of the piston assembly may be performed more smoothly.

Specifically, when the sensed force exceeds a threshold, the controller may control a motion of the insertion robot to adjust a position of the piston assembly so that the center of the piston assembly may be aligned with the center of the cylinder bore. When the sensed force is less than or equal to the threshold, the controller may control the piston insertion module to insert the piston assembly into the cylinder bore.

When the piston assembly comes into contact with the cylinder bore, the sensor of the insertion robot may sense the force acting between the piston assembly and the cylinder bore, and the controller may compare the sensed force with the threshold to determine whether the center of the piston assembly is aligned with the center of the cylinder bore. When the sensed force exceeds the threshold, the controller may control the motion of the insertion robot to adjust the position of the piston assembly so that the center of the piston assembly may be aligned with the center of the cylinder bore.

The piston assembly may include a piston, a plurality of piston rings mounted on an outer surface of the piston, and a connecting rod swingably connected to the piston. The piston insertion module may further include a swing prevention mechanism preventing the connecting rod from swinging with respect to the piston when the gripper grips the piston assembly.

The swing prevention mechanism may include: an actuator, a pair of first arms pivotally mounted on both sides of the actuator, and a pair of second arms connected to the pair of first arms, respectively.

When the piston assembly is moved above the cylinder bore after the gripper grips the piston assembly (the pick-up of the piston assembly), the connecting rod may swing with respect to the piston due to an unwanted external force. If the swing of the connecting rod continues, it may prevent the piston assembly from being inserted into the cylinder bore. As the pair of first arms pivot toward the connecting rod, the pair of second arms may temporarily press both sides of the connecting rod to thereby prevent the connecting rod from swinging due to the unwanted external force, and thus the insertion of the piston assembly into the cylinder bore may not be hindered. When the piston assembly is inserted into the cylinder bore by the push mechanism, the pair of first arms may return to their original positions.

The apparatus may further include a compression jig located above the cylinder block. The compression jig may compress the piston rings inward in a radial direction of the piston. The compression jig may include a compression sleeve aligned with the cylinder bore of the cylinder block, and the compression sleeve may guide the piston assembly into the cylinder bore, and compress the piston rings inward in the radial direction of the piston. The compression sleeve may include: a first guide portion having an inner diameter corresponding to that of the cylinder bore, and a second guide portion extending upwardly from the first guide portion. The first guide portion may have a first guide surface aligned with an inner surface of the cylinder bore, and the second guide portion may have a second guide surface tapered with respect to the first guide surface at a predetermined angle. A diameter of the second guide surface may gradually increase in a direction upward from the first guide surface.

When the piston assembly is inserted into the cylinder bore by the push mechanism, the compression jig may compress the piston rings inward in the radial direction of the piston above the cylinder bore, and accordingly the piston assembly may be more easily inserted into the cylinder bore.

The cylinder block may have a cylinder wall by which the cylinder bore is defined, the cylinder wall may have a first tapered surface provided on a top end thereof, and a diameter of the first tapered surface may gradually increase in an upward direction. The compression sleeve may have an insertion portion provided on a bottom end thereof, the insertion portion may protrude downwardly from the bottom end of the compression sleeve, and the insertion portion may have a second tapered surface fitting in the first tapered surface of the cylinder wall.

As the second tapered surface of the compression sleeve fits in the first tapered surface of the cylinder wall, the compression sleeve of the compression jig may be accurately aligned and positioned with respect to the cylinder bore.

According to another aspect of the present disclosure, a method for piston insertion may include: bringing a piston assembly into contact with a cylinder block, sensing a force acting between the piston assembly and the cylinder block, and inserting the piston assembly into a cylinder bore of the cylinder block when the sensed force is less than or equal to a threshold.

The method may further include adjusting a position of the piston assembly so that a center of the piston assembly is aligned with a center of the cylinder bore when the sensed force exceeds the threshold.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
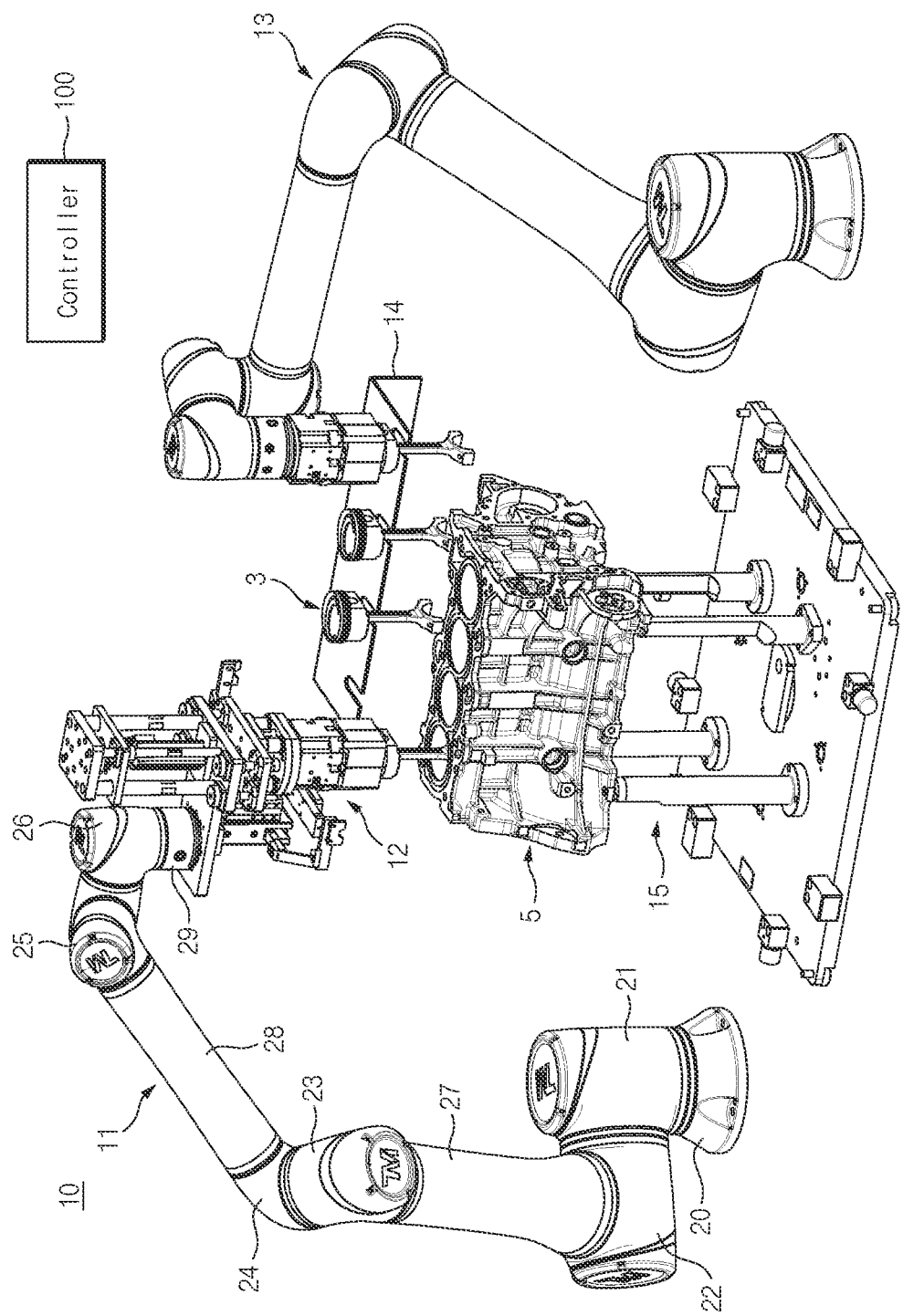
FIG. 1 illustrates a perspective view of an apparatus for piston insertion according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an apparatus 10 for piston insertion according to an exemplary embodiment of the present disclosure may include an insertion robot 11 and a piston insertion module 12 directly mounted on the insertion robot 11.

The apparatus 10 for piston insertion according to an exemplary embodiment of the present disclosure may be configured to insert piston assemblies 3 into respective cylinder bores 6 of a cylinder block 5.

Figure 19:
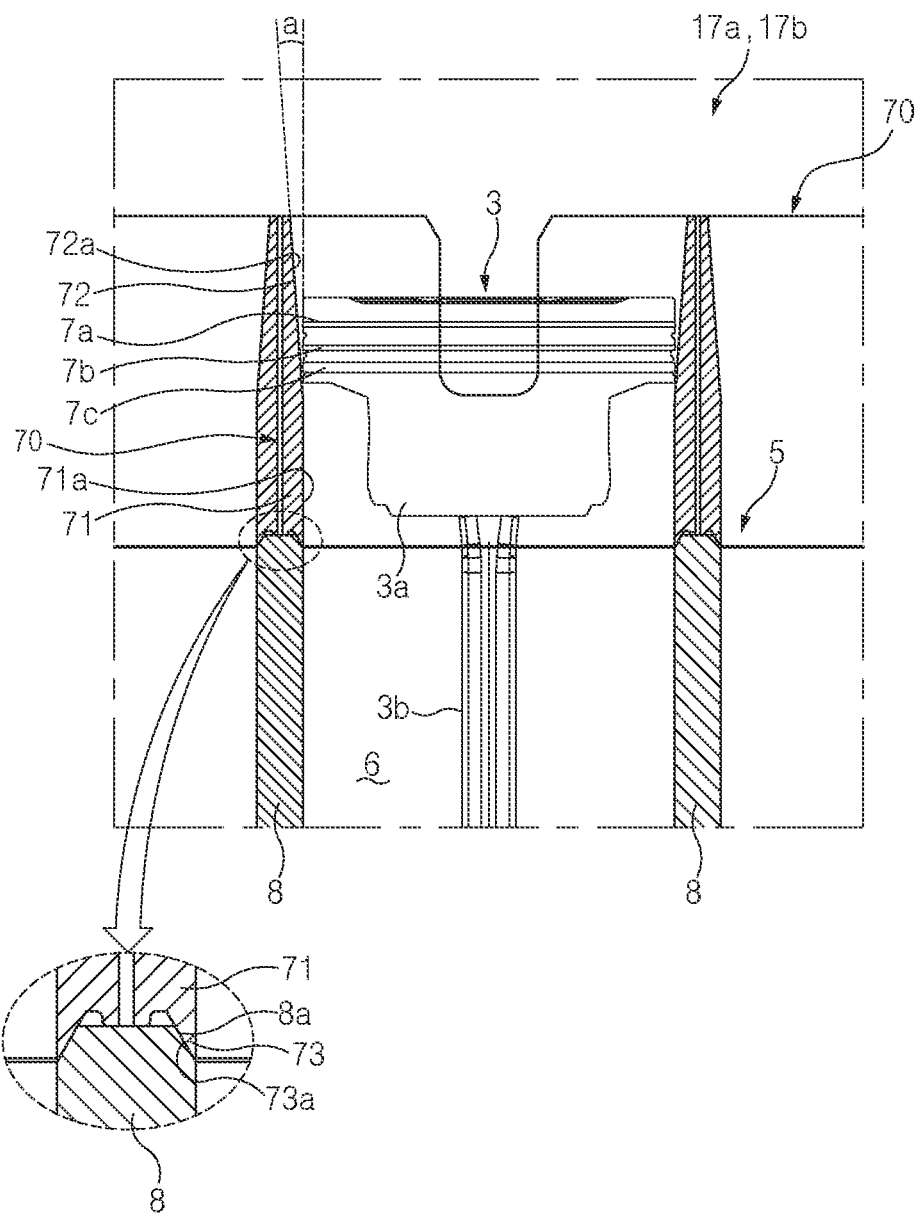
FIG. 19 illustrates a state in which a compression jig is aligned with a cylinder bore in an apparatus for piston insertion according to an exemplary embodiment of the present disclosure.

Referring to FIG. 19, each piston assembly 3 may include a piston 3a, a connecting rod 3b swingably mounted to the piston 3a, and a plurality of piston rings 7a, 7b, and 7c mounted on an outer surface of the piston 3a. The piston 3a may have a plurality of grooves formed on an outer circumference thereof, and the plurality of piston rings 7a, 7b, and 7c may be inserted into the plurality of grooves, respectively. For example, the plurality of piston rings 7a, 7b, and 7c may include two compression rings 7a and 7b and an oil ring 7c. The cylinder block 5 may have the plurality of cylinder bores 6, and the plurality of piston assemblies 3 may be inserted into the plurality of cylinder bores 6, respectively.

Figure 2:
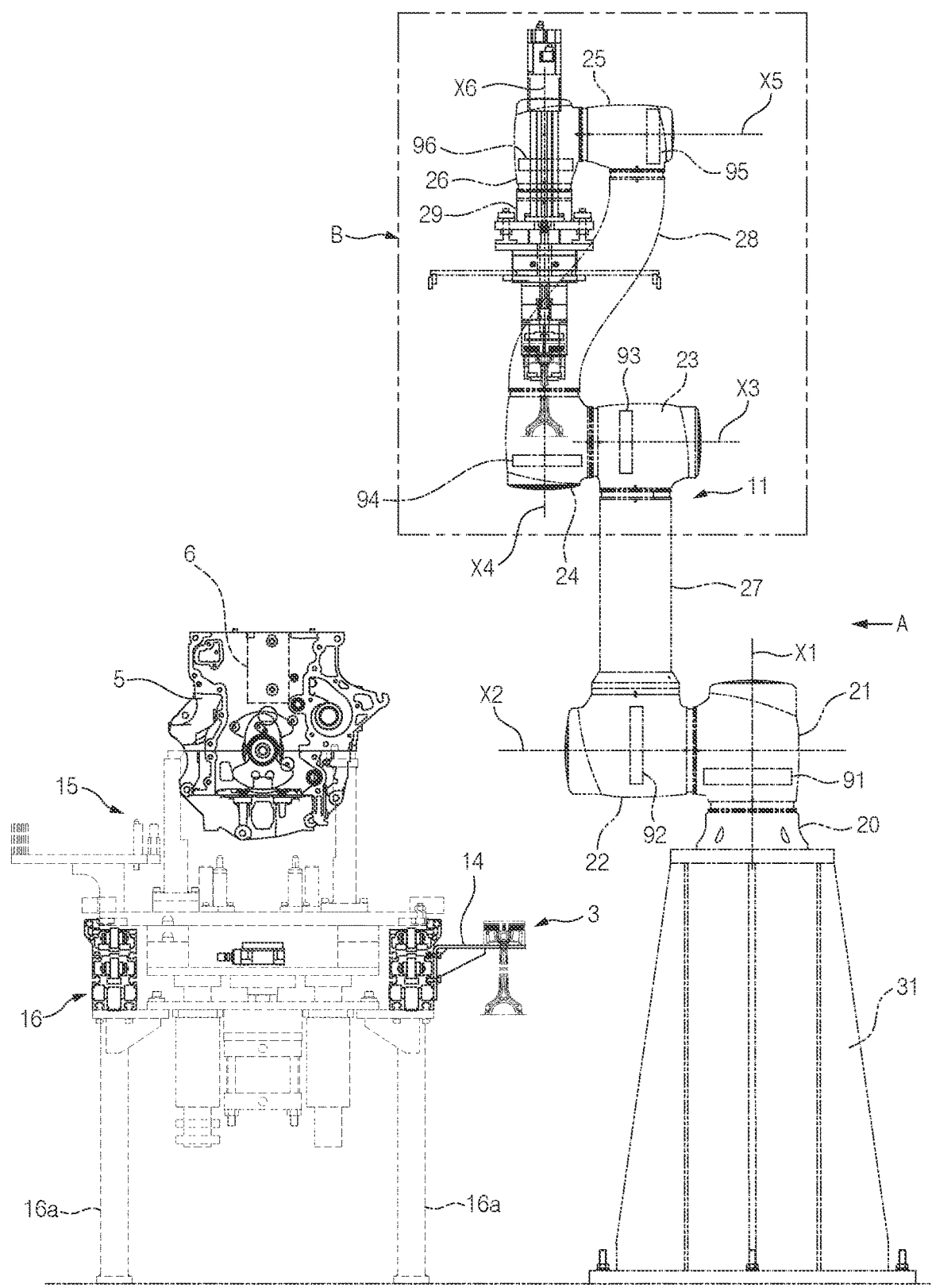
FIG. 2 illustrates a side view of an apparatus for piston insertion according to an exemplary embodiment of the present disclosure.
Figure 3:
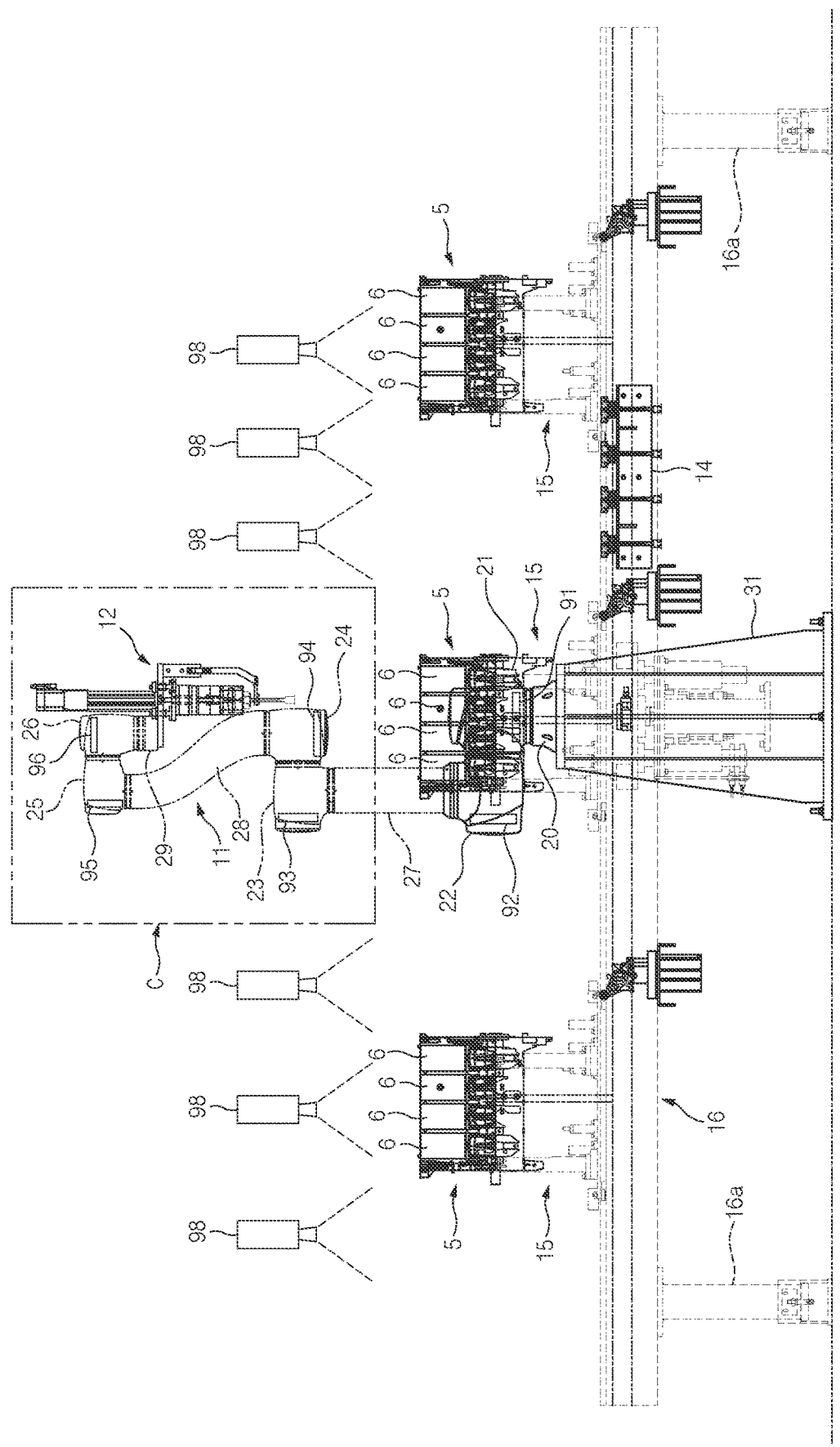
FIG. 3 illustrates the apparatus for piston insertion, which is viewed from direction A of FIG. 2.

Referring to FIGS. 2 and 3, the insertion robot 11 may include a base 20 mounted on a support 31, a proximal robot arm 27 located relatively close to the base 20, a distal robot arm 29 located relatively far from the base 20, and at least one central robot arm 28 located between the proximal robot arm 27 and the distal robot arm 29. In addition, the insertion robot 11 may include a plurality of articulated joints 21, 22, 23, 24, 25, and 26 by which the base 20, the proximal robot arm 27, the distal robot arm 29, and the central robot arm 28 are articulately connected. For example, the plurality of articulated joints 21, 22, 23, 24, 25, and 26 may include a first joint 21 connected to the base 20, a second joint 22 connected to the first joint 21, a third joint 23 connected to a distal end of the proximal robot arm 27, a fourth joint 24 connected to the third joint 23, a fifth joint 25 connected to the central robot arm 28, and a sixth joint 26 connected to the fifth joint 25. The first joint 21 may rotate around a first vertical axis X1, the second joint 22 may rotate around a first horizontal axis X2, the third joint 23 may rotate around a second horizontal axis X3, the fourth joint 24 may rotate around a second vertical axis X4, the fifth joint 25 may rotate around a third horizontal axis X5, and the sixth joint 26 may rotate around a third vertical axis X6.

The insertion robot 11 may have a plurality of sensors 91, 92, 93, 94, 95, and 96 each sensing a force and a torque acting on the plurality of articulated joints 21, 22, 23, 24, 25, and 26 and the plurality of robot arms 27, 28, and 29 while operating. The plurality of sensors 91, 92, 93, 94, 95, and 96 may be used to provide feedback about the states of the insertion robot (angles of rotation of the joints, operating positions and acceleration of the robot arms, etc.), and to determine environmental conditions (a contact state with an object, a distance to the object, etc.) to interact in accordance with the environmental conditions. For example, the sensors 91, 92, 93, 94, 95, and 96 may be any one of a torque sensor and a current sensor.

According to an exemplary embodiment, each of the sensors 91, 92, 93, 94, 95, and 96 may be a torque sensor mounted in each of the joints 21, 22, 23, 24, 25, and 26, and thus each sensor may measure a torque and a force acting on the rotation axis of each of the joints 21, 22, 23, 24, 25, and 26.

Referring to FIG. 1, the cylinder block 5 may be supported by jigs 15, and the insertion robot 11 may be disposed adjacent to the jigs 15. Referring to FIGS. 2 and 3, the plurality of jigs 15 may be mounted on a bed 16, and the bed 16 may be spaced apart upwardly from a floor through a plurality of legs 16a. The plurality of jigs 15 may have different structures and sizes to support the cylinder blocks 5 of internal combustion engines of different specifications.

Referring to FIG. 1, the apparatus 10 for piston insertion according to an exemplary embodiment of the present disclosure may further include a piston holder 14 holding the plurality of piston assemblies 3, and a transfer robot 13 configured to transfer the piston assemblies 3 to the piston holder 14.

Figure 15:
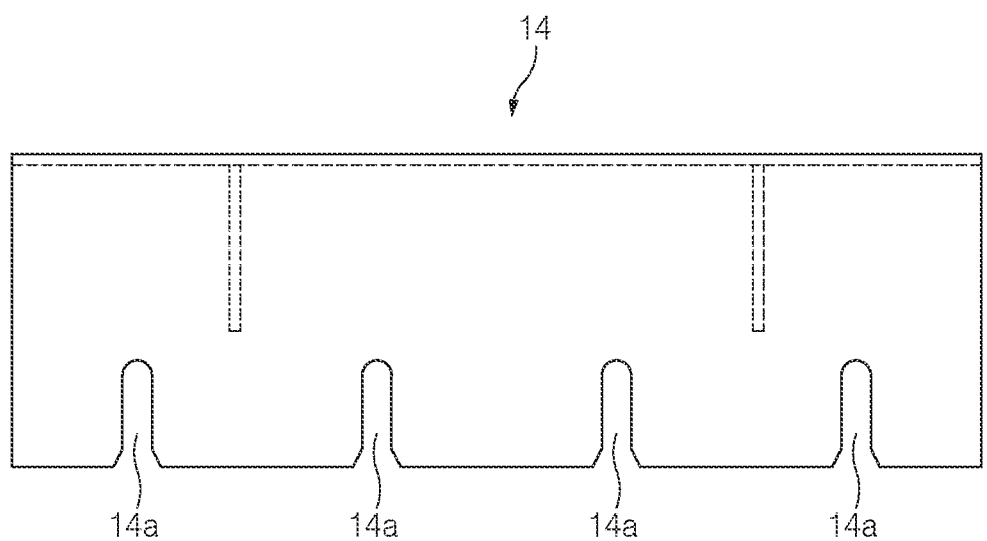
FIG. 15 illustrates a plan view of a piston holder of an apparatus for piston insertion according to an exemplary embodiment of the present disclosure.

Referring to FIGS. 2 and 3, the piston holder 14 may be disposed adjacent to the jigs 15, and the piston holder 14 may be mounted on the bed 16 through a fastener and/or the like. Referring to FIG. 15, the piston holder 14 may have a plurality of slots 14a into which the connecting rods 3b of the piston assemblies 3 are inserted.

Referring to FIG. 3, the apparatus 10 for piston insertion according to an exemplary embodiment of the present disclosure may further include one or more vision cameras 98 located above the jigs 15 and the bed 16. The vision cameras 98 may monitor types of the piston assemblies 3, assembly directions thereof, and the like. Each piston assembly 3 may have a mark indicating its assembly direction, such as an arrow, on a top surface of the piston 3a, and the vision camera 98 may check the mark of the piston 3a to accurately identify the assembly direction of the piston assembly 3.

Figure 4:
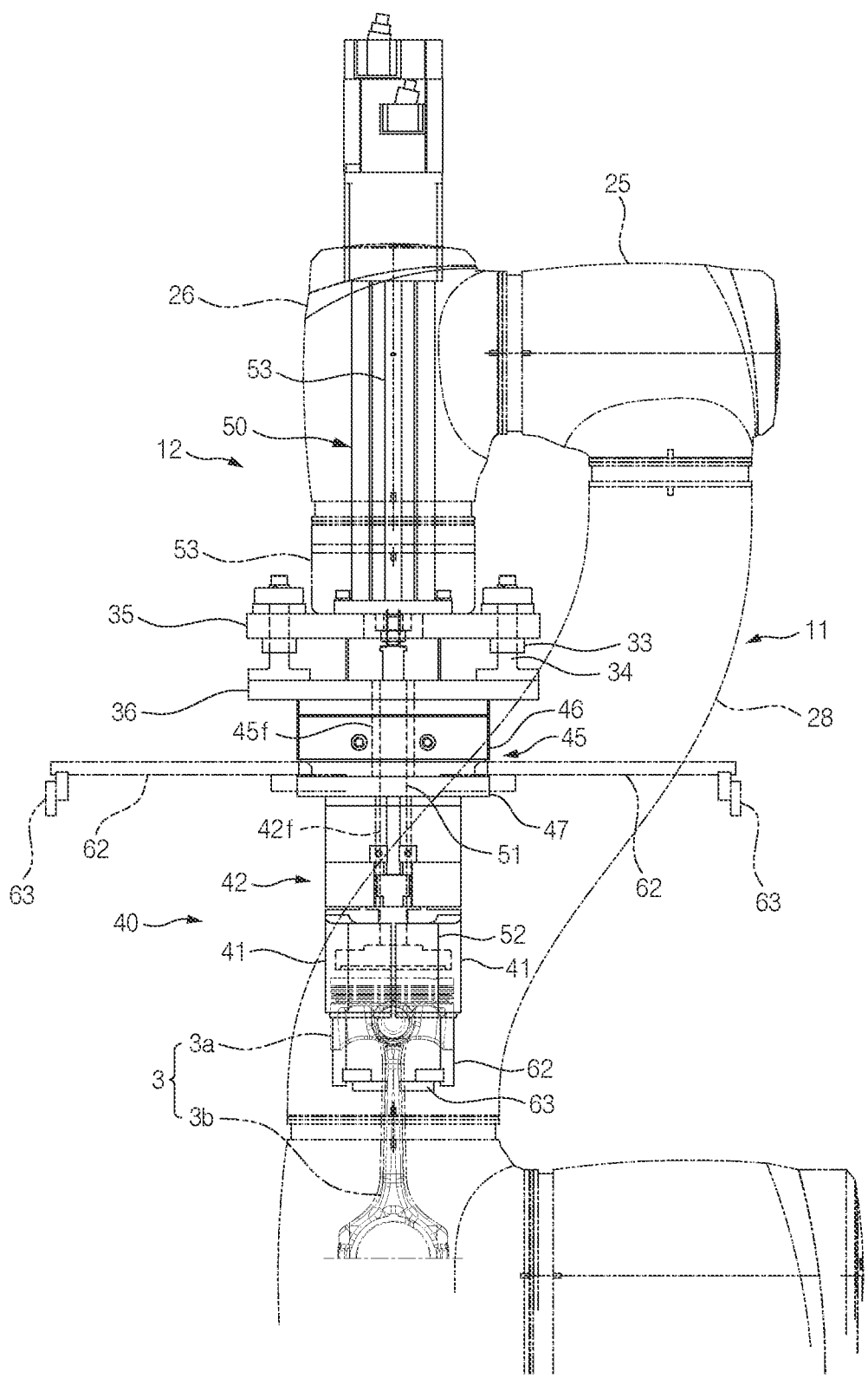
FIG. 4 illustrates an enlarged view of portion B of FIG. 2.
Figure 5:
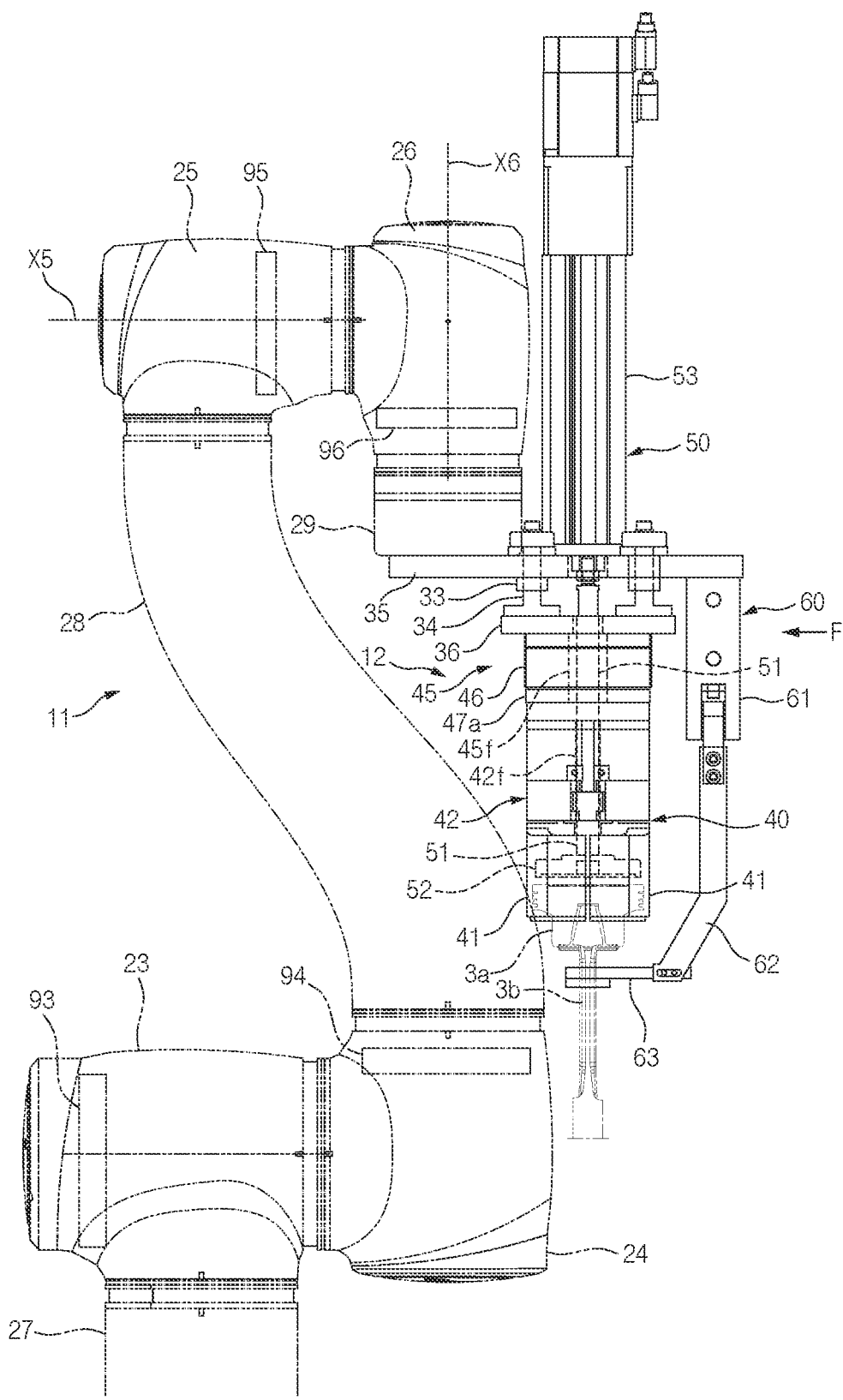
FIG. 5 illustrates an enlarged view of portion C of FIG. 3.

Referring to FIGS. 4 and 5, the piston insertion module 12 may include an upper plate 35 and a lower plate 36 spaced apart downwardly from the upper plate 35. The distal robot arm 29 of the insertion robot 11 may be joined to the upper plate 35 using fasteners, welding, and/or the like. The lower plate 36 may be connected to the upper plate 35 through a guide rod 34 and a guide bush 33.

Referring to FIGS. 4 and 5, the piston insertion module 12 may include a gripper 40 gripping and ungripping the piston assembly 3.

Figure 7:
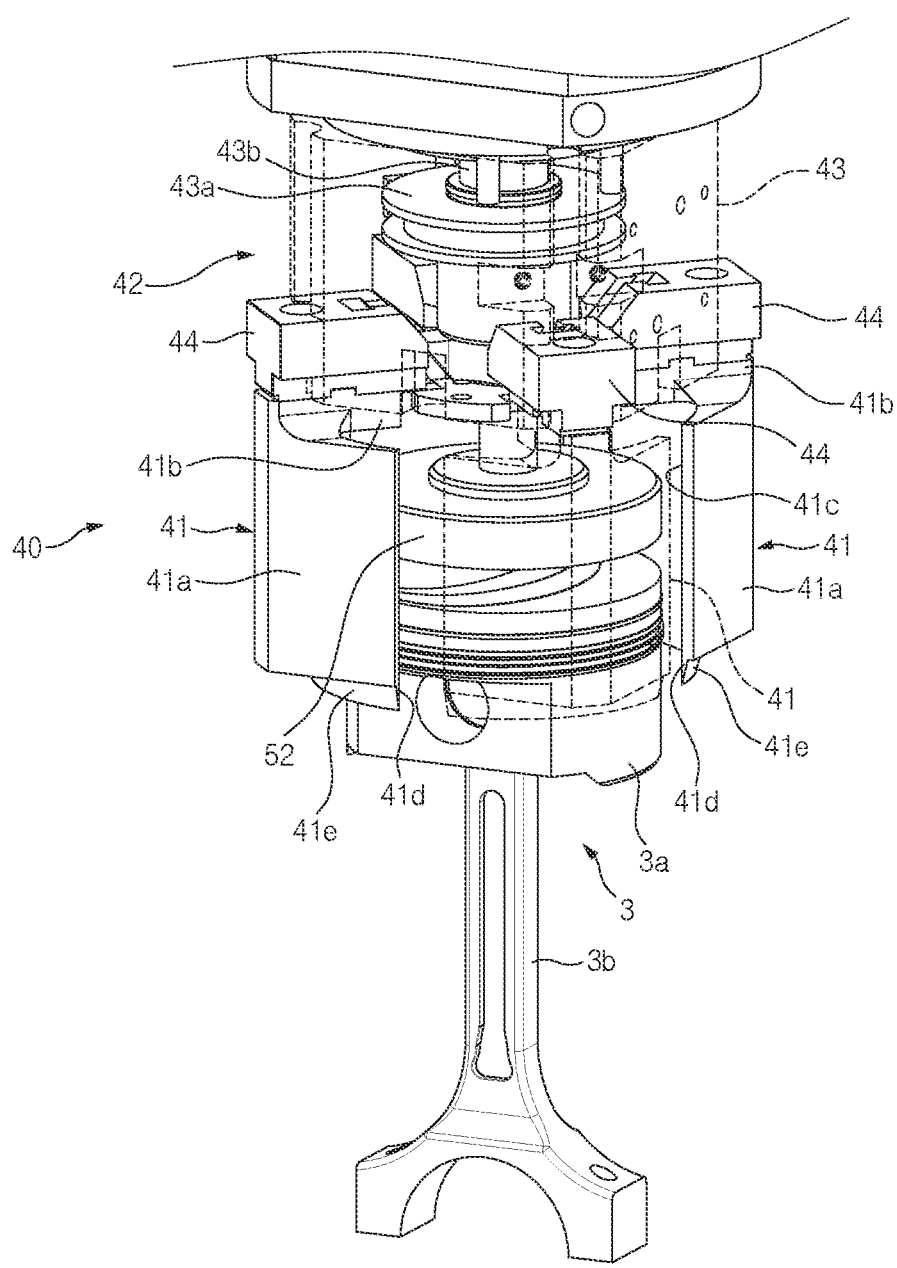
FIG. 7 illustrates a gripper of the piston insertion module illustrated in FIG. 6, in a state in which the gripper ungrips a piston assembly.
Figure 8:
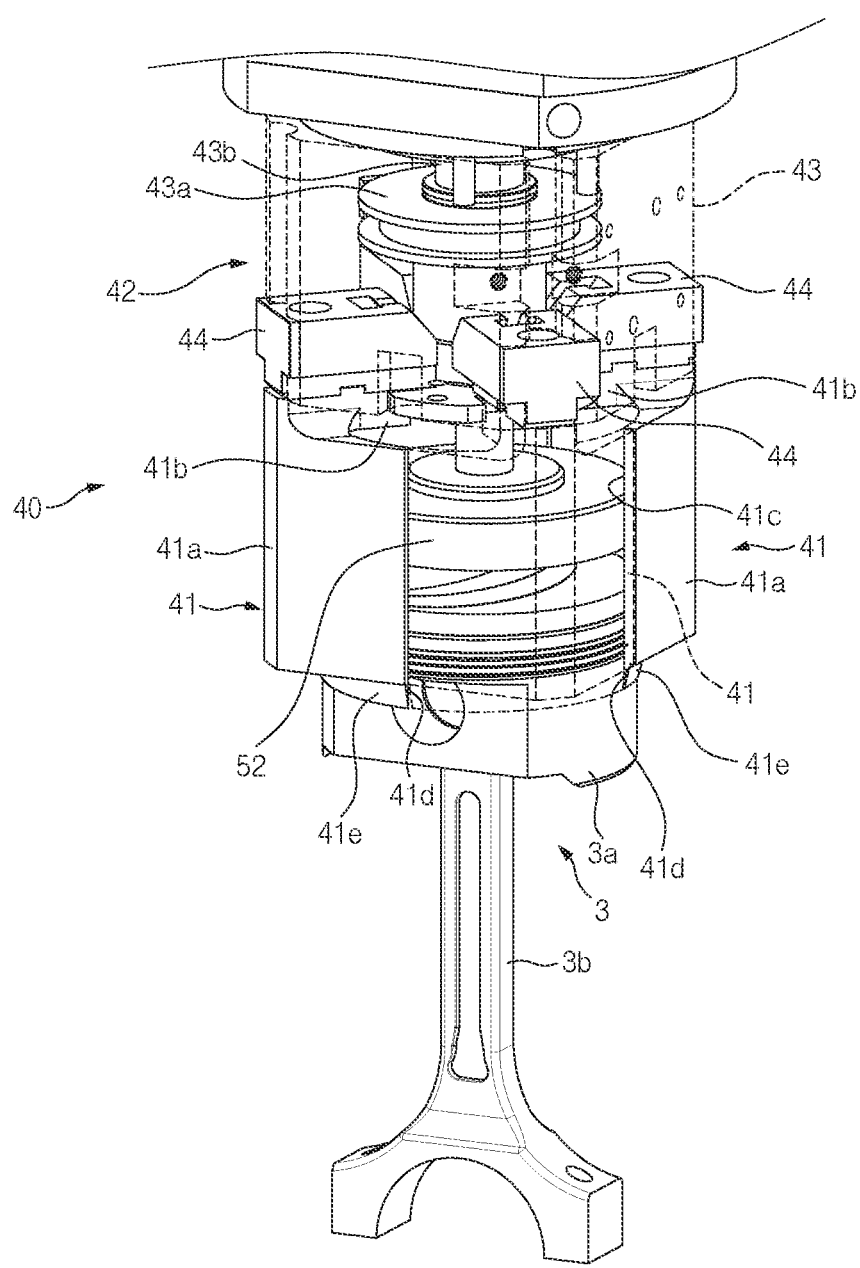
FIG. 8 illustrates a gripper of the piston insertion module illustrated in FIG. 6, in a state in which the gripper grips a piston assembly.
Figure 9:
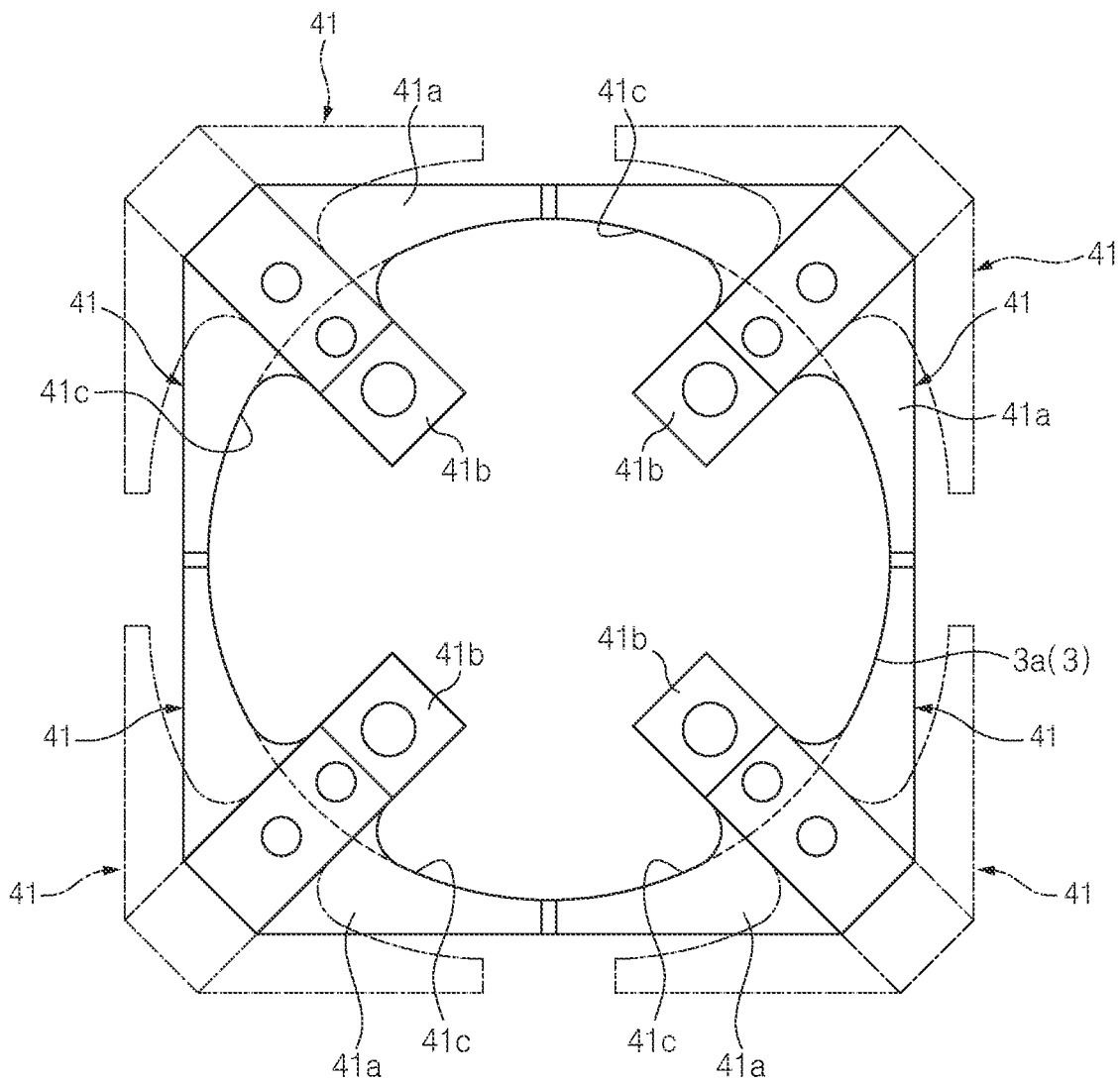
FIG. 9 illustrates a plan view of the gripper illustrated in FIGS. 7 and 8 in a state in which grip members of the gripper grip or ungrip a piston of the piston assembly.

Referring to FIGS. 7 to 9, the gripper 40 may be located on a lower portion of the piston insertion module 12, and the gripper 40 may be configured to grip and ungrip the piston assembly 3. The gripper 40 may include a plurality of grip members 41 moving to grip and ungrip the piston assembly 3, and a grip actuator 42 causing the plurality of grip members 41 to move.

The plurality of grip members 41 may grip and ungrip the outer surface of the piston 3a of the piston assembly 3. Each grip member 41 may move between a grip position (see, for example, FIG. 8 and the solid lines shown in FIG. 9) in which the grip member 41 grips the piston assembly 3 and an ungrip position (see, for example, FIG. 7 and the alternate long and short dash lines shown in FIG. 9) in which the grip member 41 ungrips the piston assembly 3.

The grip actuator 42 may include a housing 43, and a plurality of plungers 44 movably mounted on the housing 43. The number of grip members 41 may correspond to the number of plungers 44. The plurality of grip members 41 may be connected to the plurality of plungers 44, respectively, and each grip member 41 may move with the corresponding plunger 44 connected thereto in the same direction.

Figure 6:
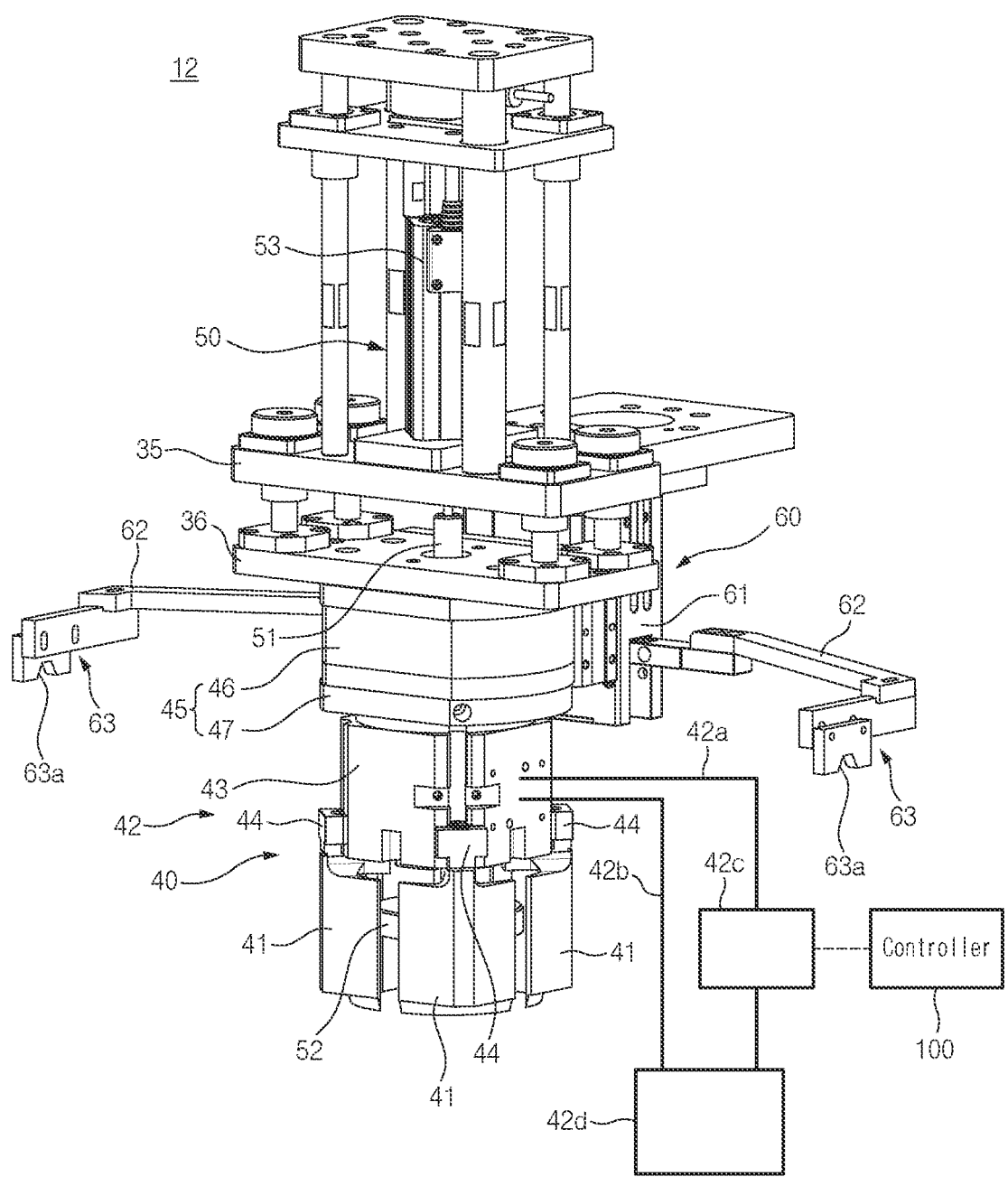
FIG. 6 illustrates a perspective view of a piston insertion module in an apparatus for piston insertion according to an exemplary embodiment of the present disclosure.

Referring to FIG. 6, the grip actuator 42 may be a pneumatic cylinder to which an air supply line 42a and an air return line 42b are connected, and an air source 42d may be fluidly connected to the air supply line 42a. Referring to FIGS. 7, 8, 11, and 13, a piston 43a and a piston rod 43b may move vertically inside the housing 43.

Figure 12:
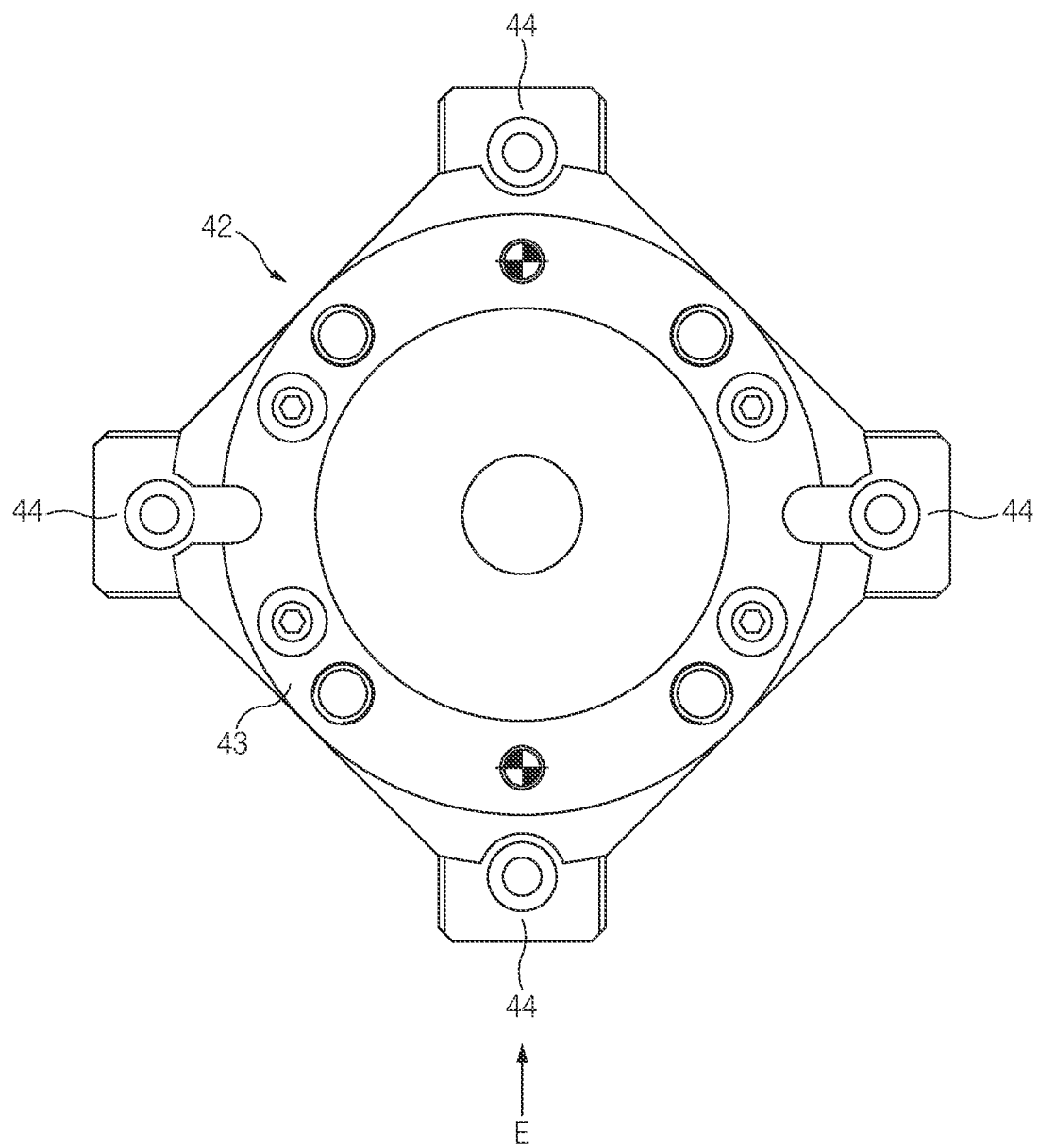
FIG. 12 illustrates a plan view of a grip actuator of the gripper illustrated in FIGS. 7 and 8 in a state in which plungers of the grip actuator protrude outward from a housing.
Figure 13:
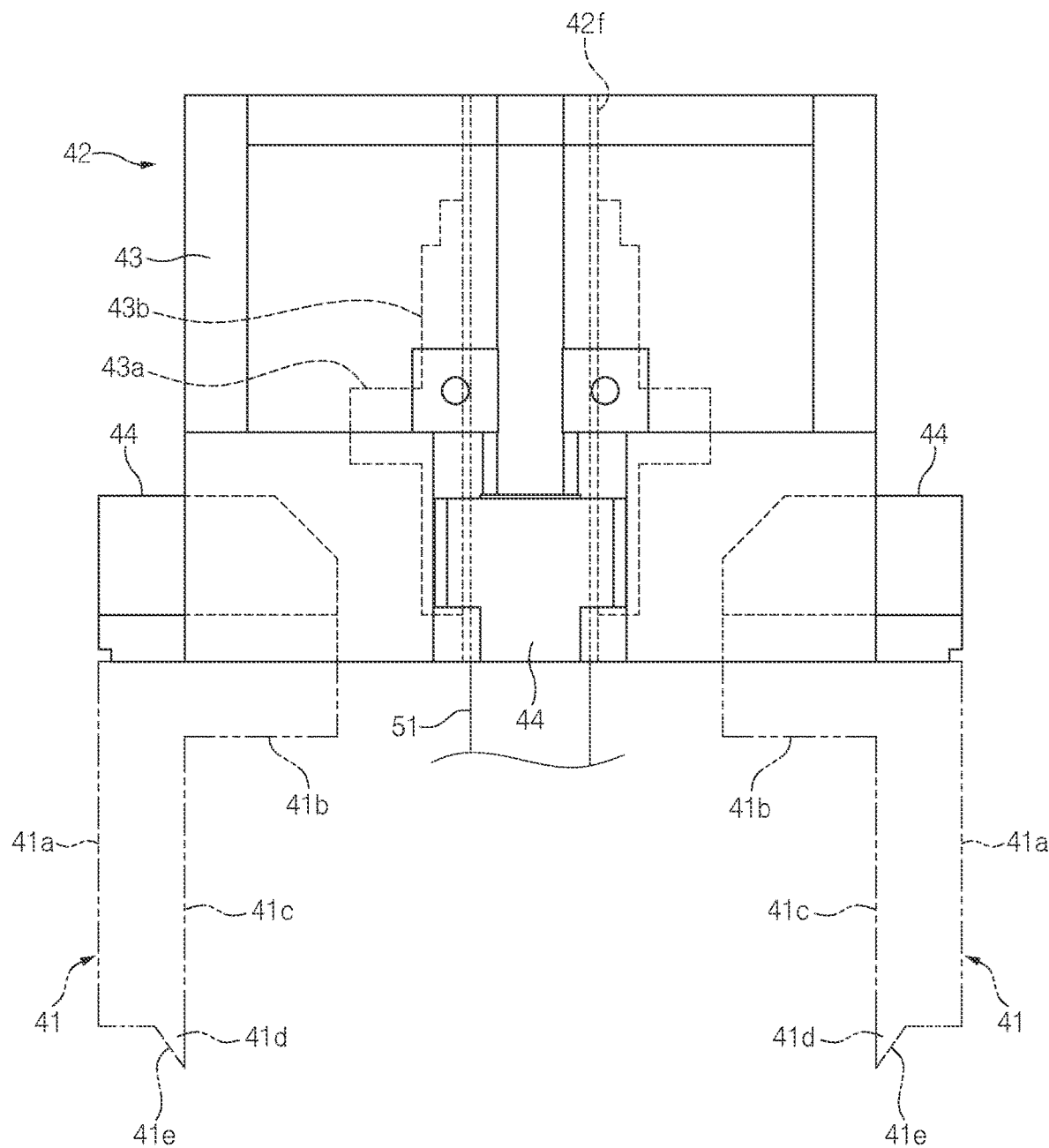
FIG. 13 illustrates the grip actuator of the gripper, which is viewed from direction E of FIG. 12.

When air is supplied from the air source 42d to the housing 43 through the air supply line 42a, the piston 43a and the piston rod 43b may move downwardly inside the housing 43 as illustrated in FIG. 13. The plurality of plungers 44 may protrude outward from the housing 43 as illustrated in FIG. 12, and the plurality of grip members 41 may move outward in a radial direction of the piston assembly 3 so that the plurality of grip members 41 may move to the ungrip position.

Figure 10:
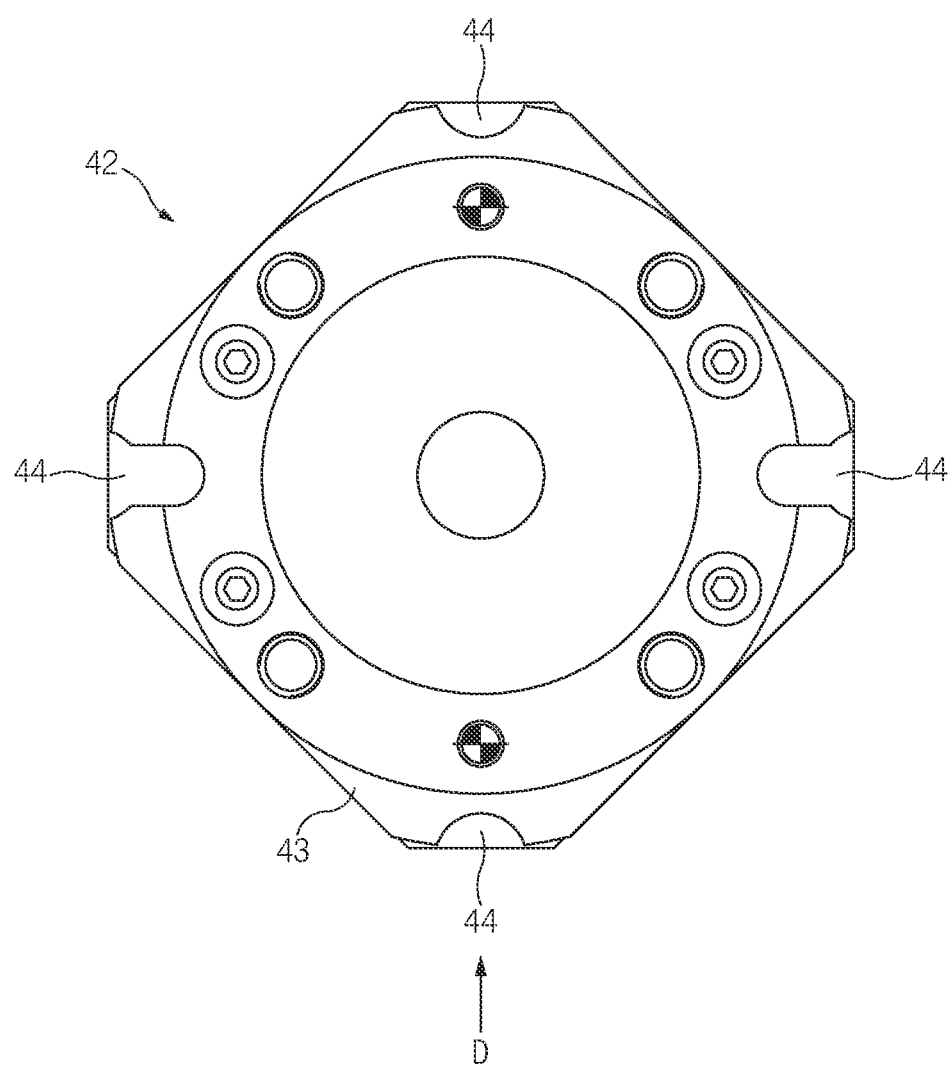
FIG. 10 illustrates a plan view of a grip actuator of the gripper illustrated in FIGS. 7 and 8 in a state in which plungers of the grip actuator are received in a housing.
Figure 11:
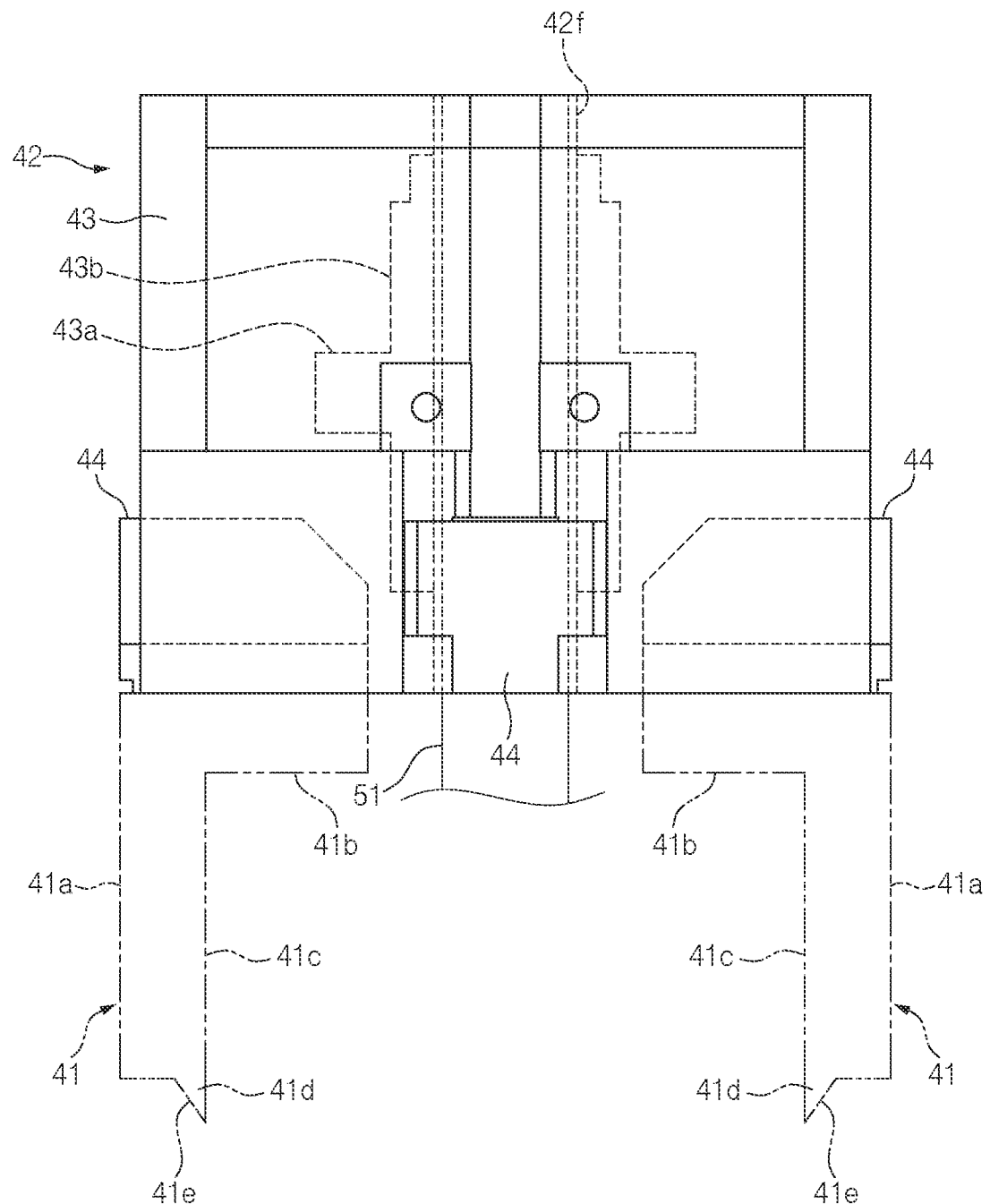
FIG. 11 illustrates the grip actuator of the gripper, which is viewed from direction D of FIG. 10.

When the air is returned from the housing 43 to the air source 42d through the air return line 42b, the piston 43a and the piston rod 43b may move upwardly inside the housing 43 as illustrated in FIG. 11. The plurality of plungers 44 may be received in the housing 43 as illustrated in FIG. 10, and the plurality of grip members 41 may move inward in the radial direction of the piston assembly 3 so that the plurality of grip members 41 may move to the grip position.

Referring to FIG. 6, the grip actuator 42 may further include an electronic pressure regulator 42c mounted on the air supply line 42a. A controller 100 may transmit a control signal to the electronic pressure regulator 42c to thereby control the electronic pressure regulator 42c, and the electronic pressure regulator 42c may steplessly regulate or control a pressure of the air supplied into the housing 43 through the air supply line 42a according to the control signal transmitted from the controller 100. Since the pressure of the air supplied to the grip actuator is steplessly regulated by the electronic pressure regulator 42c, the plurality of grip members 41 may freely adjust a gripping force when gripping the piston assembly.

Specifically, when the piston insertion module 12 picks up the piston assembly 3 from the piston holder 14, the pressure of the air supplied to the housing 43 of the grip actuator 42 may be relatively increased (for example, 5 bar) by the electronic pressure regulator 42c so that the gripper 40 may grip the piston assembly 3 with a relatively large gripping force. When a push mechanism 50 pushes the piston assembly 3 to the cylinder bore 6, the pressure of the air supplied to the housing 43 of the grip actuator 42 may be relatively reduced (for example, 1 bar) by the electronic pressure regulator 42c so that the gripper 40 may grip the piston assembly 3 with a relatively small gripping force. Accordingly, the piston assembly 3 may be smoothly inserted into the cylinder bore 6, and an insertion load acting when the piston assembly 3 is inserted into the cylinder bore 6 may be relatively reduced. For example, an apparatus for piston insertion according to the related art inserts a piston assembly into a cylinder bore in a state of gripping the piston assembly with a relatively large gripping force, and accordingly an insertion load may be approximately 25 kgf. However, the apparatus for piston insertion according to an exemplary embodiment of the present disclosure may insert the piston assembly 3 into the cylinder bore 6 in a state of gripping the piston assembly 3 with a relatively small gripping force, and accordingly an insertion load may be approximately 6 kgf. Thus, the insertion load may be significantly reduced compared to the related art.

Referring to FIGS. 7 and 8, each grip member 41 may include a grip portion 41a gripping the piston assembly 3, and a connection portion 41b provided on a top end of the grip portion 41a. The grip portion 41a may have a grip surface 41c that matches a portion of the outer surface of the piston 3a of the piston assembly 3. The connection portion 41b may be connected to a bottom surface of the corresponding plunger 44 using fasteners, welding, and/or the like. As each grip member 41 is connected to the bottom surface of the corresponding plunger 44 through the connection portion 41b, the grip member 41 may be accurately moved by the grip actuator 42.

Referring to FIGS. 4 to 6, the piston insertion module 12 may include a centering mechanism 45 performing a centering operation in which the center of the piston assembly 3 is aligned with the center of the cylinder bore 6 of the cylinder block 5. Specifically, the centering mechanism 45 may be located above the gripper 40, and in particular, the centering mechanism 45 may adjust the position of the gripper 40 so as to cause the center of the piston assembly 3 gripped by the gripper 40 to be aligned with the center of the cylinder bore 6.

The centering mechanism 45 may include a fixed portion 46 fixed to the lower plate 36, and a floating portion 47 moving relative to the fixed portion 46. The floating portion 47 may move in a relatively horizontal direction with respect to the fixed portion 46 or be tilted with respect to the fixed portion 46 by various actuators (not shown). Here, the actuator may be an electric actuator or a pneumatic actuator. In particular, a top surface of the housing 43 of the grip actuator 42 of the gripper 40 may be fixed to a bottom surface of the floating portion 47 through a fastener and/or the like. In the centering mechanism 45, the fixed portion 46 may be fixed to the lower plate, and the bottom surface of the floating portion 47 may be fixed to the top surface of the grip actuator 42 of the gripper 40, and as the floating portion 47 moves relative to the fixed portion 46, the position of the gripper 40 having gripped the piston assembly 3 may be moved relative to the cylinder bore 6. The centering mechanism 45 may adjust the position of the gripper 40 so that the center of the piston assembly 3 may be accurately aligned with the center of the cylinder bore 6.

Referring to FIGS. 4 and 5, the piston insertion module 12 may include the push mechanism 50 pushing the piston assembly 3 to the cylinder bore 6 of the cylinder block 5 so as to insert the piston assembly 3 into the cylinder bore 6.

Referring to FIGS. 4 and 5, the push mechanism 50 may include a push rod 51 moving vertically, and a push actuator 53 causing the push rod 51 to move.

The push rod 51 may extend through the gripper 40 and the centering mechanism 45. A push pad 52 may be provided on a bottom end portion of the push rod 51, and the push pad 52 may have a shape corresponding to the top surface of the piston 3a.

The grip actuator 42 of the gripper 40 may have a through hole 42f provided in the center thereof, and the through hole 42f may have an inner diameter greater than an outer diameter of the push rod 51. The centering mechanism 45 may have a through hole 45f provided in the center thereof, and the through hole 45f may be formed in the center of the fixed portion 46 and the center of the floating portion 47. The through hole 45f may have an inner diameter greater than the outer diameter of the push rod 51. Thus, the push rod 51 may pass through the through hole 42f of the grip actuator 42 and the through hole 45f of the centering mechanism 45, so that the push rod 51 may move vertically in the through hole 42f of the grip actuator 42 and the through hole 45f of the centering mechanism 45.

The push actuator 53 may be located above the centering mechanism 45. In particular, the push actuator 53 may be mounted on a top surface of the upper plate 35 so that the push actuator 53 may be stably supported to the upper plate 35. As the push actuator 53 is located above the centering mechanism 45, the gripper 40, the centering mechanism 45, and the push mechanism 50 may be arranged vertically, and thus the piston insertion module 12 may be a compact structure, which may allow the piston insertion module 12 and the distal robot arm 29 of the insertion robot 11 to be easily assembled. Since the piston insertion module 12 and the insertion robot 11 do not interfere with each other, the degree of freedom in the operation of the insertion robot 11 may be improved. For example, the push actuator 53 may be a pneumatic actuator.

As described above, the piston insertion module 12 may grip the piston assembly 3 using the gripper 40, allow the piston assembly 3 to be centered with respect to the cylinder bore 6 using the centering mechanism 45, and insert the piston assembly 3 into the cylinder bore 6 using the push mechanism 50. Since the piston insertion module 12 automatically and continuously performs the gripping operation of the piston assembly 3, the centering operation of the piston assembly 3, and the insertion operation of the piston assembly 3, the piston insertion module 12 may perform a process of inserting the piston assembly 3 into the cylinder bore 6 more accurately and quickly through cooperation with the insertion robot 11.

As the robot arms 27, 28, and 29 and the articulated joints 21, 22, 23, 24, 25, and 26 of the insertion robot 11 operate, the distal robot arm 29 may move toward the piston holder 14, and the gripper 40 of the piston insertion module 12 may grip the piston assembly 3 held by the piston holder 14.

After the gripper 40 grips the piston assembly 3, the piston insertion module 12 may move toward the cylinder bore 6 of the cylinder block 5 by the operation of the insertion robot 11, and the centering operation of the piston assembly 3 may be performed by the centering mechanism 45 of the piston insertion module 12 so that the center of the piston assembly 3 may be aligned with the center of the cylinder bore 6. When the piston assembly 3 starts to come into contact with a portion of the cylinder block 5 (a top surface of the cylinder block 5 or an inner surface of the cylinder bore 6) by the gripper 40, at least one sensor of the insertion robot 11 may sense a force acting between the piston assembly 3 and the cylinder block 5. The controller 100 may control a motion of the insertion robot 11 depending on the force sensed by the sensor of the insertion robot 11, thereby additionally performing the centering operation that causes the center of the piston assembly 3 to be aligned with the center of the cylinder bore 6. Thus, the insertion robot 11 may additionally correct the centering operation of the piston assembly 3 by the sensor and the controller 100. In particular, the controller 100 may control the motion of the insertion robot 11 through a blind search algorithm or uniformed search algorithm.

Figure 16:
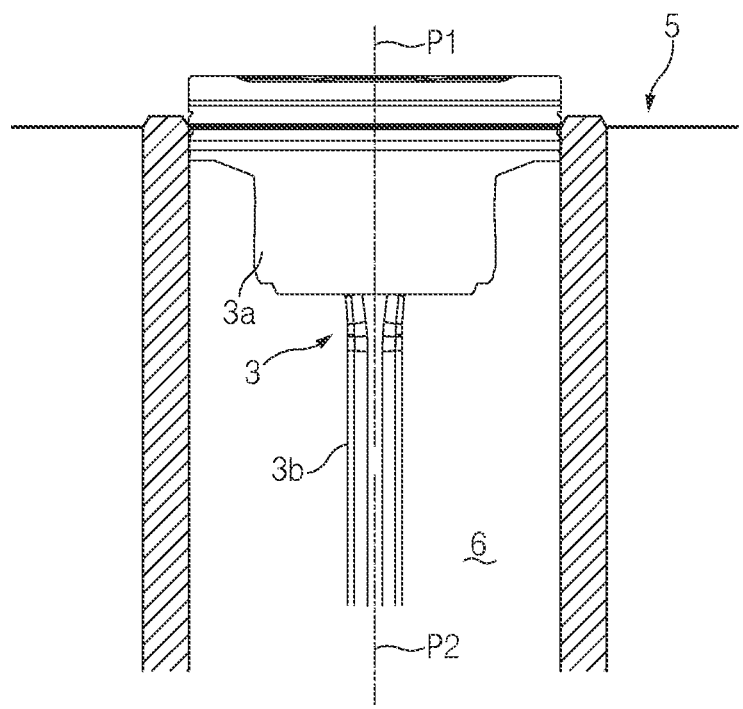
FIG. 16 illustrates a state in which a piston assembly is aligned with a cylinder bore of a cylinder block.

Referring to FIG. 16, when the piston assembly 3 starts to come into contact with the portion of the cylinder block 5, and a center P1 of the piston assembly 3 gripped by the gripper 40 is aligned with a center P2 of the cylinder bore 6, the controller 100 may determine that the force sensed by the sensor of the insertion robot 11 is less than or equal to a threshold. The threshold may be a reference value for determining whether the center P1 of the piston assembly 3 is aligned with the center P2 of the cylinder bore 6. When the force sensed by the sensor of the insertion robot 11 is less than or equal to the threshold, the controller 100 may control the push actuator 53 of the push mechanism 50 so that the push rod 51 of the push mechanism 50 may push the piston assembly 3 toward the cylinder bore 6, and thus the piston assembly 3 may be inserted into the cylinder bore 6.

Figure 17:
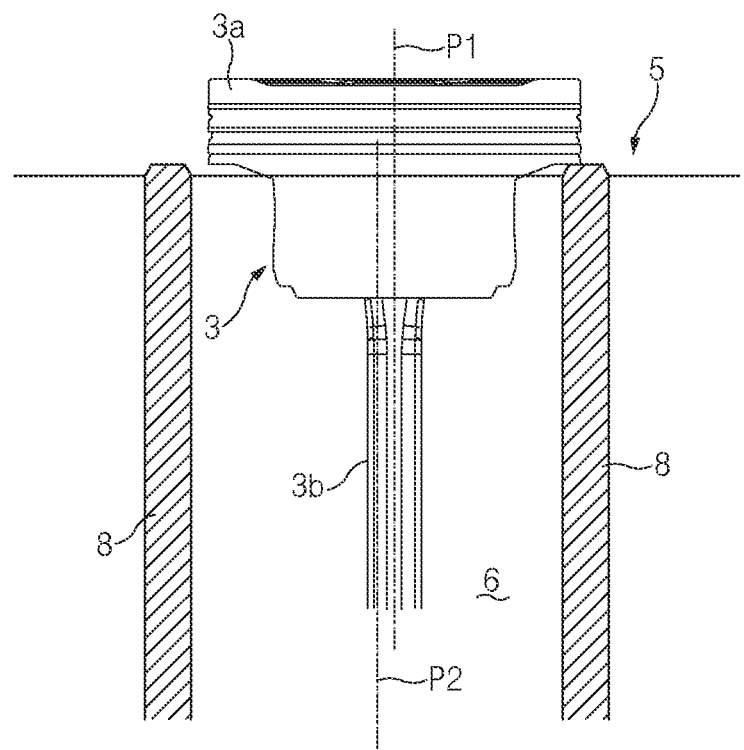
FIG. 17 illustrates a state in which a piston assembly is not aligned with a cylinder bore of a cylinder block.

Referring to FIG. 17, when the piston assembly 3 starts to come into contact with the portion of the cylinder block 5, and the center P1 of the piston assembly 3 gripped by the gripper 40 is not aligned with the center P2 of the cylinder bore 6, the controller 100 may determine that the force sensed by the sensor of the insertion robot 11 exceeds the threshold. When the force sensed by the sensor of the insertion robot 11 exceeds the threshold, the controller 100 may control the motion of the insertion robot 11 to adjust the position of the piston assembly 3 so that the center P1 of the piston assembly 3 may be aligned with the center P2 of the cylinder bore 6.

Specifically, when the piston assembly 3 comes into contact with the portion of the cylinder block 5, the sensor of the insertion robot 11 may sense the force acting between the piston assembly 3 and the cylinder block 5, and the controller 100 may compare the sensed force with the threshold to determine whether the center P1 of the piston assembly 3 is aligned with the center P2 of the cylinder bore 6. When the force sensed by the sensor of the insertion robot 11 exceeds the threshold, the controller 100 may control the motion of the insertion robot 11 to adjust the position of the piston assembly 3 so that the center P1 of the piston assembly 3 may be aligned with the center P2 of the cylinder bore 6.

Since the insertion robot 11 allows the center P1 of the piston assembly 3 to be aligned with the center P2 of the cylinder bore 6 by the sensor and the controller 100, the centering of the piston assembly 3 with respect to the cylinder bore 6 may be additionally corrected. The piston assembly 3 may be inserted into the cylinder bore 6 in a state in which the center P1 of the piston assembly 3 is aligned with the center P2 of the cylinder bore 6 more accurately. Thus, damage or breakage of the piston assembly 3 and/or the cylinder bore 6 may be reliably prevented, and the insertion process of the piston assembly 3 may be performed more smoothly.

Figure 14:
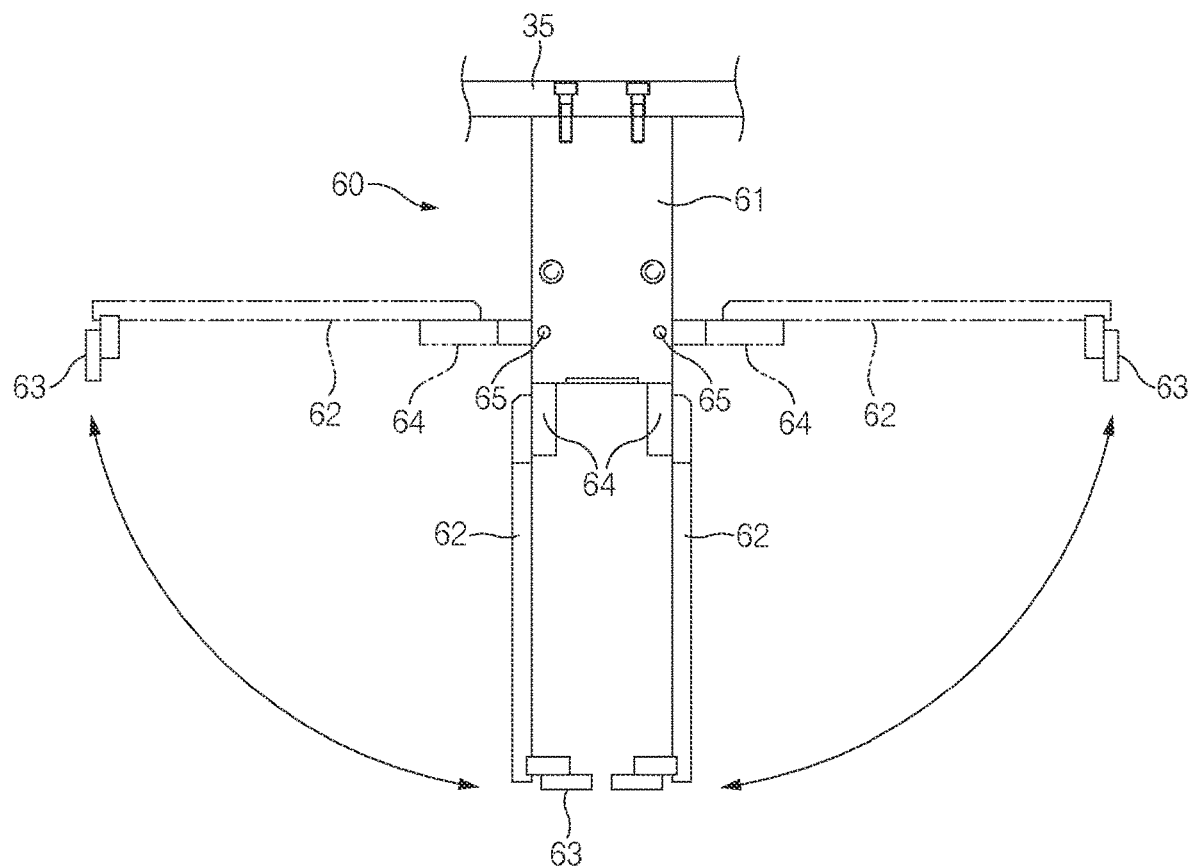
FIG. 14 illustrates a swing prevention mechanism in an apparatus for piston insertion according to an exemplary embodiment of the present disclosure.

Referring to FIGS. 5, 6, and 14, the piston insertion module 12 may further include a swing prevention mechanism 60 preventing the connecting rod 3b from swinging with respect to the piston 3a by an unwanted external force when the gripper 40 picks up the piston assembly 3 from the piston holder 14.

After the gripper 40 of the piston insertion module 12 grips the piston 3a of the piston assembly 3, the insertion robot 11 may move the piston assembly 3 above the cylinder bore 6 of the cylinder block 5. That is, the insertion robot 11 and the piston insertion module 12 may pick up the piston assembly 3. Thereafter, the centering mechanism 45 of the piston insertion module 12 may perform the centering operation that causes the center of the piston assembly 3 to be aligned with the center of the cylinder bore 6. When the piston assembly 3 is moved above the cylinder bore 6 by the piston insertion module 12 in a state in which the gripper 40 grips the piston 3a of the piston assembly 3, and the centering mechanism 45 operates for the centering of the piston assembly 3, the unwanted external force may be applied to the connecting rod 3b, and accordingly the connecting rod 3b may swing with respect to the piston 3a due to the unwanted external force. If the swing of the connecting rod 3b continues when the piston assembly 3 is inserted into the cylinder bore 6 by the push mechanism 50, the insertion of the piston assembly 3 may not be performed smoothly. Thus, the swing prevention mechanism 60 may prevent the connecting rod 3b from swinging before the piston assembly 3 is inserted into the cylinder bore 6.

The swing prevention mechanism 60 may be disposed so as not to interfere with the gripper 40, the centering mechanism 45, and the push mechanism 50. In particular, the swing prevention mechanism 60 may be mounted on an end portion of the upper plate 35, so that the swing prevention mechanism 60 may be spaced apart from the gripper 40, the centering mechanism 45, and the push mechanism 50.

The swing prevention mechanism 60 may include an actuator 61, a pair of first arms 62 pivotally mounted on both sides of the actuator 61, and a pair of second arms 63 connected to the pair of first arms 62, respectively.

The actuator 61 may be joined to the upper plate 35 of the piston insertion module 12 through a fastener and/or the like. The actuator 61 may include a pair of pivot members 64 pivotally mounted on both sides thereof, and the pivot members 64 may be pivotally mounted on the actuator 61 through pivot pins 65. The actuator 61 may be any one of an electric actuator and a pneumatic actuator.

The pair of first arms 62 may be connected to the pair of pivot members 64 through fasteners and/or the like, respectively. Each first arm 62 may extend from a bottom end of the corresponding pivot member 64 to below the gripper 40, and a bottom end of the first arm 62 may be bent toward the piston assembly 3 gripped by the gripper 40.

Each second arm 63 may be connected to the bottom end of the corresponding first arm 62 through a fastener and/or the like, and the second arm 63 may extend from the bottom end of the first arm 62 toward the piston assembly 3 gripped by the gripper 40. The second arm 63 may have a recess 63a corresponding to an outward shape of the connecting rod 3b.

When the piston assembly 3 gripped by the gripper 40 is moved above the cylinder bore 6 by the insertion robot 11 in a state in which the gripper 40 grips the piston 3a of the piston assembly 3, and the centering mechanism 45 operates for the centering of the piston assembly 3, the pair of first arms 62 may pivot toward the piston assembly 3 by the actuator 61, and the pair of second arms 63 may press both sides of the connecting rod 3b of the piston assembly 3 symmetrically, so that the connecting rod 3b may be prevented from swinging with respect to the piston 3a. In particular, when each of the second arms 63 presses the connecting rod 3b, the connecting rod 3b may be received in the recess 63a of the second arm 63 so that the connecting rod 3b may keep a stable vertical state. When the push mechanism 50 pushes the piston assembly 3 into the cylinder bore 6, the pair of first arms 62 may return to their original positions by pivoting away from the piston assembly 3.

Figure 18:
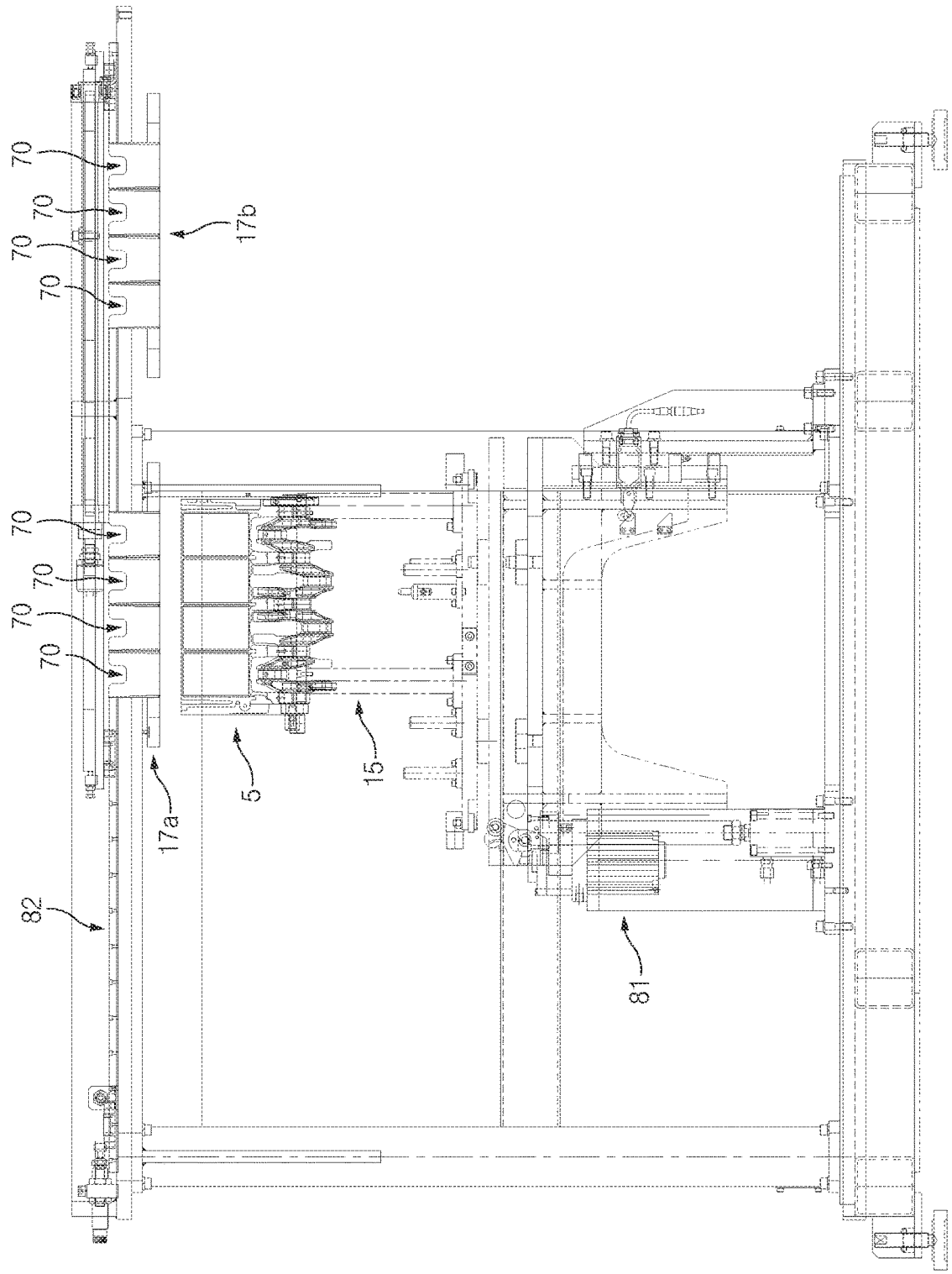
FIG. 18 illustrates an apparatus for piston insertion according to an exemplary embodiment of the present disclosure.

Referring to FIG. 18, the apparatus 10 for piston insertion according to an exemplary embodiment of the present disclosure may further include compression jigs 17a and 17b compressing the piston rings 7a, 7b, and 7c of the piston assembly 3 inward in the radial direction of the piston 3a.

Before the piston assembly 3 is inserted into the cylinder bore 6, the piston rings 7a, 7b, and 7c inserted into the respective grooves of the piston 3a may be in a state of being expanded outward in the radial direction. Since the piston rings 7a, 7b, and 7c are in the expanded state when the piston assembly 3 is inserted into the cylinder bore 6, an insertion force required to insert the piston assembly 3 into the cylinder bore 6 may increase, and accordingly an insertion load of the piston assembly 3 may relatively increase. In order to deal with this, the apparatus for piston insertion according to an exemplary embodiment of the present disclosure may compress the piston rings 7a, 7b, and 7c inward in the radial direction of the piston 3a by the compression jigs 17a and 17b when the piston assembly 3 is inserted into the cylinder bore 6, thereby relatively reducing the force required to insert the piston assembly 3, and thus improving the quality of insertion of the piston assembly 3.

The compression jigs 17a and 17b may be located above the cylinder block 5. When the piston assembly 3 is inserted into the cylinder bore 6 by the push mechanism 50, the compression jigs 17a and 17b may compress the piston rings 7a, 7b, and 7c inward in the radial direction of the piston 3a so that the piston assembly 3 may be smoothly inserted into the cylinder bore 6. The compression jigs 17a and 17b may include a plurality of compression sleeves 70 aligned with the cylinder bores 6 of the cylinder block 5, respectively. Each compression sleeve 70 may guide the piston assembly 3 into the cylinder bore 6 and compress the piston rings 7a, 7b, and 7c inward in the radial direction of the piston 3a.

Referring to FIG. 19, each compression sleeve 70 may include a first guide portion 71 having an inner diameter corresponding to that of the cylinder bore 6, and a second guide portion 72 extending upwardly from the first guide portion 71. The first guide portion 71 may have a first guide surface 71a aligned with the inner surface of the cylinder bore 6, and the second guide portion 72 may have a second guide surface 72a tapered with respect to the first guide surface 71a at a predetermined angle a. In particular, a diameter of the second guide surface 72a may gradually increase in a direction upward from the first guide surface 71a. When the piston assembly 3 is inserted into the cylinder bore 6 by the push mechanism 50, the piston rings 7a, 7b, and 7c attached to the outer circumference of the piston 3a may move downwardly along the second guide surface 72a of the second guide portion 72 and the first guide surface 71a of the first guide portion 71, and the piston rings 7a, 7b, and 7c may be compressed in the grooves of the piston 3a inward in the radial direction thereof. Thus, the piston assembly 3 may be easily inserted into the cylinder bore 6 with a relatively small insertion force.

Referring to FIG. 18, the plurality of compression jigs 17a and 17b may be located above the jigs 15 supporting the cylinder block 5, and the plurality of compression jigs 17a and 17b may have different shapes and sizes according to different specifications of internal combustion engines. The jig 15 may be moved by a lifting mechanism 81 in a vertical direction. When the jig 15 is moved upwardly by the lifting mechanism 81, any one of the plurality of compression jigs 17a and 17b may be disposed on the top surface of the cylinder block 5. The plurality of compression jigs 17a and 17b may be moved by a shuttle mechanism 82 such as a linear guide in a horizontal direction, and any one of the compression jigs 17a and 17b that matches the specification of each cylinder block 5 may be selectively aligned above the cylinder block 5. In other words, the compression jigs 17a and 17b that match the specifications of the internal combustion engines may be aligned above the corresponding cylinder blocks 5 by the shuttle mechanism 82, thereby flexibly responding to the assembly process of various types of internal combustion engines.

Referring to FIG. 19, each cylinder bore 6 of the cylinder block 5 may be defined by a cylinder wall 8. The cylinder wall 8 may have a first tapered surface 8a provided on a top end thereof, and a diameter of the first tapered surface 8a may gradually increase in an upward direction. The compression sleeve 70 of each of the compression jigs 17a and 17b may have an insertion portion 73 provided on a bottom end thereof, and the insertion portion 73 may protrude downwardly from the bottom end of the compression sleeve 70. The insertion portion 73 may have a second tapered surface 73a fitting in the first tapered surface 8a of the cylinder wall 8. As the second tapered surface 73a fits in the first tapered surface 8a, the insertion portion 73 may be inserted into the top end of the cylinder wall 8. Thus, the compression sleeves 70 of the compression jigs 17a and 17b may be accurately aligned and positioned with respect to the corresponding cylinder bores 6.

Referring to FIGS. 7, 8, 11, and 13, each grip member 41 of the gripper 40 may have an insertion portion 41d provided on a bottom end thereof. After the compression jigs 17a and 17b are separated from the top surface of the cylinder block 5, each insertion portion 41d of the grip member 41 may be inserted into the top end of the cylinder wall 8 as the gripper 40 moves downwardly toward the cylinder block 5. In particular, the insertion portion 41d of the grip member 41 may have a tapered surface 41e fitting in the first tapered surface 8a of the cylinder wall 8.

Figure 20:
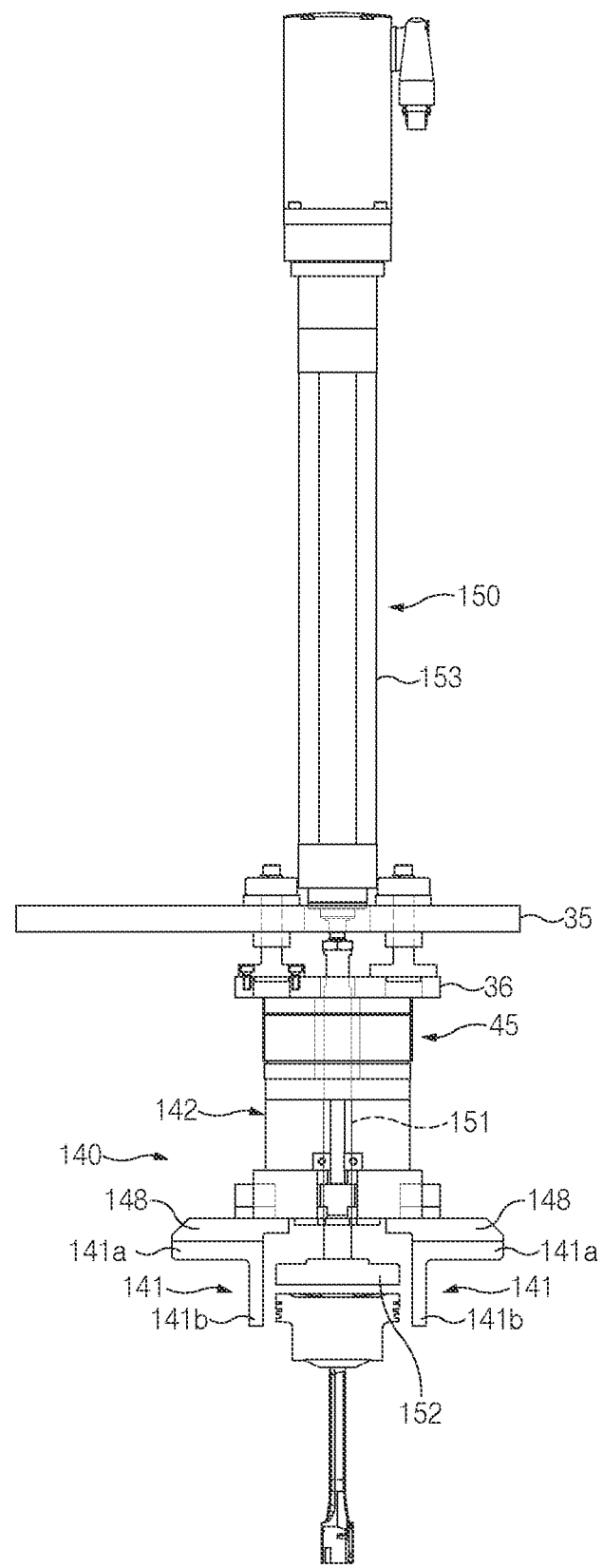
FIG. 20 illustrates a piston insertion module in an apparatus for piston insertion according to another exemplary embodiment of the present disclosure.

According to another exemplary embodiment illustrated in FIG. 20, a push mechanism 150 may include a push rod 151 moving in a vertical direction, and a push actuator 153 causing the push rod 151 to move. The push rod 151 may extend through a gripper 140 and the centering mechanism 45. A push pad 152 may be provided on a bottom end portion of the push rod 151, and the push pad 152 may have a shape corresponding to that of the top surface of the piston 3a. The push actuator 153 may be an electric actuator.

The gripper 140 may include a plurality of grip members 141 moving to grip and ungrip the piston assembly 3, and a grip actuator 142 causing the plurality of grip members 141 to move. The plurality of grip members 141 may be connected to the grip actuator 142 through a plurality of mounting members 148, respectively. Each grip member 141 may include an engagement portion 141a engaged with the corresponding mounting member 148, and a grip portion 141b extending downwardly from the engagement portion 141a.

According to exemplary embodiments of the present disclosure, the gripper may be modified to have various shapes that match those of various components assembled to the cylinder block, such as pistons, bolts, dowel pins, nipples, and springs. Thus, the apparatus for piston insertion according to exemplary embodiments of the present disclosure may be configured to insert various components such as bolts, dowel pins, nipples, and springs, in addition to the piston, into corresponding portions of the cylinder block.

Figure 21:
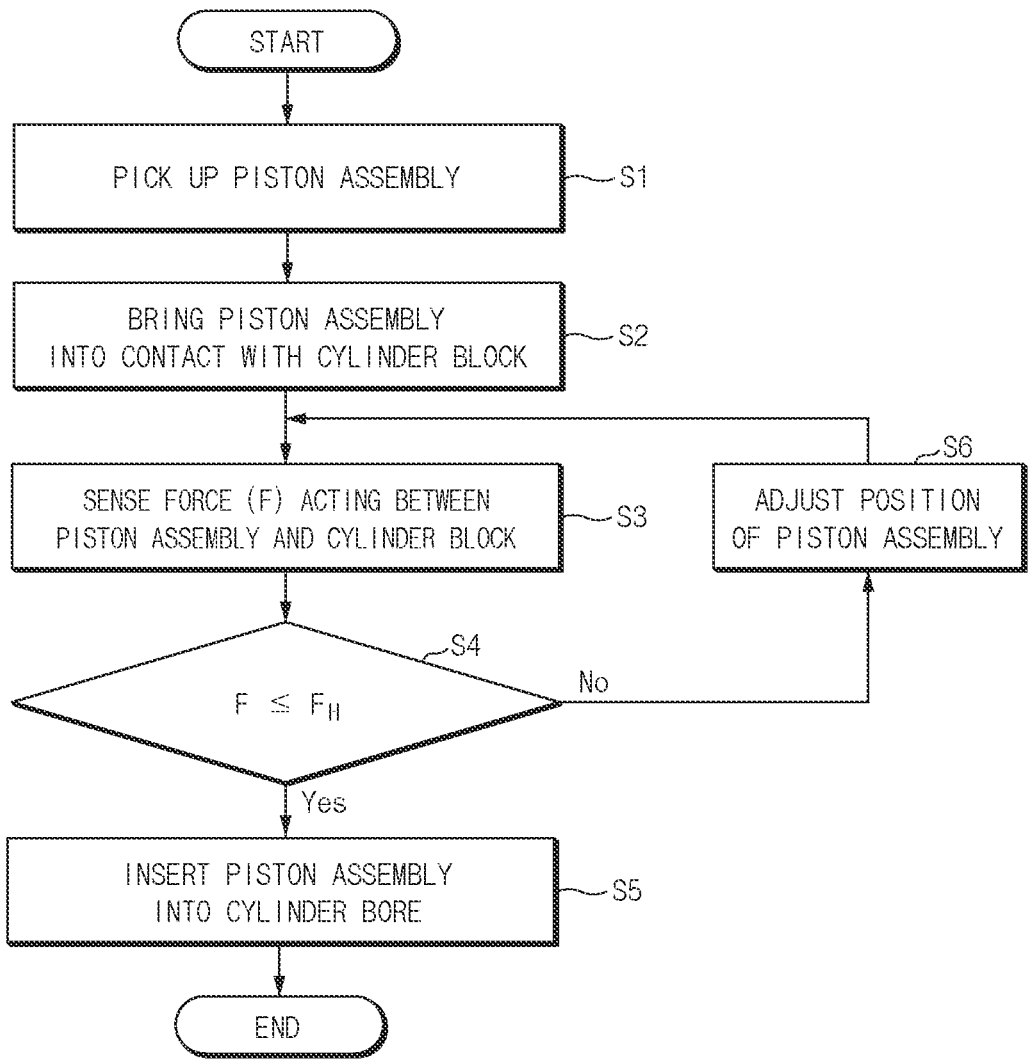
FIG. 21 illustrates a flowchart of a method for piston insertion according to an exemplary embodiment of the present disclosure.

FIG. 21 illustrates a flowchart of a method for inserting a piston assembly according to an exemplary embodiment of the present disclosure.

As the insertion robot 11 operates, the distal robot arm 29 of the insertion robot 11 may move toward the piston holder 14, and the piston insertion module 12 mounted on the distal robot arm 29 may be positioned above the piston holder 14. The gripper 40 of the piston insertion module 12 may grip any one piston assembly 3 held by the piston holder 14, and then the piston insertion module 12 that has gripped the piston assembly 3 may be positioned above the cylinder bore 6 of the cylinder block 5 by the operation of the insertion robot 11. When the piston insertion module 12 is positioned above the cylinder bore 6 of the cylinder block 5, the centering mechanism 45 may cause the center of the piston assembly 3 to be aligned with the center of the cylinder bore 6, and the insertion robot 11 and the piston insertion module 12 may pick up the piston assembly 3 (S1).

After the insertion robot 11 and the piston insertion module 12 pick up the piston assembly 3, the insertion robot 11 may move the distal robot arm 29 downwardly, thereby bringing the piston assembly 3 into contact with a portion of the cylinder block 5 (S2).

At least one of the sensors 91, 92, 93, 94, 95, and 96 of the insertion robot 11 may sense a force F acting between the piston assembly 3 and the cylinder block 5 (S3).

It may be determined whether the force F sensed by the sensor of the insertion robot 11 is less than or equal to a threshold $F_H$ (S4). Here, the threshold $F_H$ may be a reference value for determining whether the center P1 of the piston assembly 3 is aligned with the center P2 of the cylinder bore 6.

When the force F sensed by the sensor of the insertion robot 11 is less than or equal to the threshold $F_H$, the controller 100 may control the operation of the push actuator 53 of the push mechanism 50 so that the push rod 51 of the push mechanism 50 may push the piston assembly 3 toward the cylinder bore 6, and thus insert the piston assembly 3 into the cylinder bore 6 (S5).

When the force F sensed by the sensor of the insertion robot 11 exceeds the threshold $F_H$, the controller 100 may control the motion of the insertion robot 11 and adjust the position of the piston assembly 3 (S6). Thereafter, the method may return to S3.

As set forth above, the apparatus and the method for piston insertion according to exemplary embodiments of the present disclosure may employ a relatively small number of robots as the piston insertion module is directly mounted on the insertion robot, thereby reducing installation cost and manufacturing cost, taking up a relatively small installation space, and inserting the piston assembly into the cylinder bore accurately and reliably.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for piston insertion, the apparatus comprising:
    an insertion robot having a plurality of robot arms connected by a plurality of articulated joints;
    a piston insertion module directly mounted on the insertion robot, gripping a piston assembly, and configured to insert the piston assembly into a cylinder bore of a cylinder block; and
    a controller controlling an operation of the insertion robot and an operation of the piston insertion module; and
    a compression jig located above the cylinder block,
    wherein the piston insertion module includes:
        a gripper for gripping and ungripping the piston assembly;
        a push mechanism including a push rod configured to move in a vertical direction, and a push actuator causing the push rod to move; and
        a centering mechanism causing a center of the piston assembly to be aligned with a center of the cylinder bore,
    wherein the centering mechanism is located above the gripper, the push actuator is located above the centering mechanism, and the push rod extends through the gripper and the centering mechanism,
    wherein the piston assembly includes a piston, a plurality of piston rings mounted on an outer surface of the piston, and a connecting rod swingably connected to the piston,
    wherein the compression jig compresses the plurality of piston rings inward in a radial direction of the piston,
    wherein the compression jig includes a compression sleeve aligned with the cylinder bore of the cylinder block, wherein the compression sleeve guides the piston assembly into the cylinder bore, and
compresses the piston rings inward in the radial direction of the piston,
wherein the compression sleeve is a single component comprising therein:
a first guide portion having an inner diameter corresponding to that of the cylinder bore; and
a second guide portion extending upwardly from the first guide portion,
wherein the first guide portion has a first guide surface aligned with an inner surface of the cylinder bore,
wherein the second guide portion has a second guide surface tapered with respect to the first guide surface at a predetermined angle,
wherein the piston is configured to move in a downward direction along first the second guide surface and then the first guide surface, and
wherein a diameter of the second guide surface gradually increases in a direction upward from the first guide surface.

2. The apparatus according to claim 1, wherein the gripper includes: a plurality of grip members configured to move between a grip position in which the grip members grip the piston assembly and an ungrip position in which the grip members ungrip the piston assembly; and a grip actuator causing the plurality of grip members to move.

3. The apparatus according to claim 2, wherein the grip actuator includes:
a housing; and
a plurality of plungers movably mounted on the housing, whereinthe plurality of grip members are connected to the plurality of plungers, respectively.

4. The apparatus according to claim 3, wherein the grip actuator is a pneumatic cylinder to which an air supply line and an air return line are connected,
the grip actuator further includes an electronic pressure regulator mounted on the air supply line, and
the controller controls the electronic pressure regulator to regulate a pressure of air supplied to the grip actuator.

5. The apparatus according to claim 3, wherein each grip member includes:
a grip portion gripping the piston assembly; and
a connection portion provided on a top end of the grip portion,
the grip portion having a grip surface that matches a portion of an outer surface of a piston of the piston assembly, and
the connection portion being connected to a bottom surface of a corresponding plunger.

6. The apparatus according to claim 1, wherein the piston insertion module further includes:
an upper plate directly mounted on the insertion robot; and
a lower plate located below the upper plate,
the push actuator being mounted on the upper plate, and the centering mechanism being mounted on the lower plate.

7. The apparatus according to claim 6, wherein the centering mechanism includes:
a fixed portion fixed to the lower plate; and
a floating portion moving relative to the fixed portion, and the gripper is connected to the floating portion.

8. The apparatus according to claim 1, wherein the insertion robot includes a sensor configured to sense a torque and a force acting on the plurality of articulated joints and the plurality of robot arms,
when the piston assembly comes into contact with the cylinder bore of the cylinder block, the sensor of the insertion robot senses a force acting between the piston assembly and the cylinder bore, and
the insertion robot is configured to adjust a position of the piston insertion module under control of the controller depending on the force sensed by the sensor so as to cause a center of the piston assembly to be aligned with a center of the cylinder bore.

9. The apparatus according to claim 8, wherein when the sensed force exceeds a threshold, the controller controls a motion of the insertion robot to adjust a position of the piston assembly so that the center of the piston assembly is aligned with the center of the cylinder bore.

10. The apparatus according to claim 8, wherein when the sensed force is less than or equal to a threshold, the controller controls the piston insertion module to insert the piston assembly into the cylinder bore.

11. The apparatus according to claim 1, the piston insertion module further includes a swing prevention mechanism preventing the connecting rod from swinging with respect to the piston when the gripper grips the piston assembly.

12. The apparatus according to claim 11, wherein the swing prevention mechanism includes:
an actuator;
a pair of first arms pivotally mounted on both sides of the actuator; and
a pair of second arms connected to the pair of first arms, respectively.

13. The apparatus according to claim 1, wherein the cylinder block has a cylinder wall by which the cylinder bore is defined,
the cylinder wall has a first tapered surface provided on a top end thereof,
a diameter of the first tapered surface gradually increases in an upward direction,
the compression sleeve has an insertion portion provided on a bottom end thereof,
the insertion portion protrudes downwardly from the bottom end of the compression sleeve, and
the insertion portion has a second tapered surface fitting in the first tapered surface of the cylinder wall.

14. A method for piston insertion, the method comprising:
picking up a piston assembly by a piston insertion module, bringing the piston assembly into contact with a cylinder block by an insertion robot;
sensing a force acting between the piston assembly and the cylinder block by a sensor provided on the insertion robot; and
inserting the piston assembly into a cylinder bore of the cylinder block by the piston insertion module when the sensed force is less than or equal to a threshold,
wherein the piston insertion module mounted on the insertion robot,
wherein the piston insertion module includes:
a gripper for gripping and ungripping the piston assembly;
a push mechanism including a push rod configured to move in a vertical direction, and a push actuator causing the push rod to move; and
a centering mechanism causing a center of the piston assembly to be aligned with a center of the cylinder bore,
wherein the centering mechanism is located above the gripper, the push actuator is located above the centering mechanism, and the push rod extends through the gripper and the centering mechanism, wherein the piston assembly includes a piston, a plurality of piston rings mounted on an outer surface of the piston, and a connecting rod swingably connected to the piston, wherein the compression jig compresses the plurality of piston rings inward in a radial direction of the piston, wherein a compression jig is located above the cylinder block, wherein the compression jig includes a compression sleeve aligned with the cylinder bore of the cylinder block, wherein the compression sleeve guides the piston assembly into the cylinder bore, and compresses the piston rings inward in the radial direction of the piston, wherein the compression sleeve is a single component comprising therein:
- a first guide portion having an inner diameter corresponding to that of the cylinder bore; and
- a second guide portion extending upwardly from the first guide portion, wherein the first guide portion has a first guide surface aligned with an inner surface of the cylinder bore, wherein the second guide portion has a second guide surface tapered with respect to the first guide surface at a predetermined angle, wherein the piston moves downwardly along the second guide surface and the first guide surface, and wherein a diameter of the second guide surface gradually increases in a direction upward from the first guide surface.

15. The method according to claim 14, further comprising: adjusting a position of the piston assembly so that a center of the piston assembly is aligned with a center of the cylinder bore when the sensed force exceeds the threshold.

* * * * *